US012471510B2

(12) United States Patent
NewDelman et al.

(10) Patent No.: US 12,471,510 B2
(45) Date of Patent: Nov. 18, 2025

(54) HOLLOW SHAFT DRILL BIT AND HOLLOW INSERT WITH PERFORATIONS OR SOLID FEEDER AUGER(S) AND PERFORATED HOLLOW SHAFT OR SOLID FLEXIBLE SCREW FEEDER AUGER(S)

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: SUB-MERGENT TECHNOLOGIES, INC., Southlake, TX (US)

( * ) Notice: Subject to any disclaimer, the term of this patent is extended or adjusted under 35 U.S.C. 154(b) by 675 days.

(21) Appl. No.: 17/839,481

(22) Filed: Jun. 14, 2022

(65) Prior Publication Data
US 2023/0397516 A1    Dec. 14, 2023

(51) Int. Cl.
*A01B 49/06*    (2006.01)
*A01B 79/00*    (2006.01)
*E21B 10/44*    (2006.01)

(52) U.S. Cl.
CPC .......... *A01B 49/06* (2013.01); *A01B 49/065* (2013.01); *A01B 79/005* (2013.01); *E21B 10/44* (2013.01)

(58) Field of Classification Search
CPC ......... A01B 49/06; A01B 49/04; A01B 49/00; A01B 49/065; A01B 79/005; A01B 79/00; E21B 10/44; E21B 10/00
See application file for complete search history.

(56) References Cited

U.S. PATENT DOCUMENTS 5,013,191 A * 5/1991 Kitanaka ................. E21B 7/005
299/68

* cited by examiner

Primary Examiner — Christopher J. Novosad
(74) Attorney, Agent, or Firm — Bailey Legal Services, PLLC

(57) ABSTRACT

A hollow shaft drill bit (1109) and a solid or hollow shaft auger (409B) or a solid or perforated hollow shaft flexible screw feeder auger (1107) includes a perforated hollow or solid shaft feeder auger (409B) or flexible screw feeder auger hollow with perforations or solid (1107), a hollow shaft drilling auger (1200), a flexible conveyor flight screws (1300), a second perforated hollow shaft feeder auger (603A), a PLC (1405C), an AI robot (1505), a computer (1411C), an encoder (1605B), limit switches (1707), a feeder auger tube conduit (1305A), and a feeder auger motor (905B). The solid or perforated hollow shaft flexible screw feeder auger (1207) is detachably attached to the hollow shaft drilling auger (1200) to receive vibration and torque that are dampened by a coupling or disc coupling (121B or 1213) between a platform and a gearbox interface. The flexible conveyor flight screws (1300) enable functions of the solid or a first perforated hollow shaft feeder auger (1303A) to continue despite receiving torque. The feeder auger tube conduit (1305A) includes a distinct tube (1303C) within a diameter of a feeder auger tube conduit (1305C). The feeder auger motor (905B) upon receiving a signal from the AI robot (1505), the computer (1411C), and the PLC (1405C) enable the ascension of the feeder auger motor (905B) in concert with the encoder (1605B) or limit switches (1707).

27 Claims, 30 Drawing Sheets

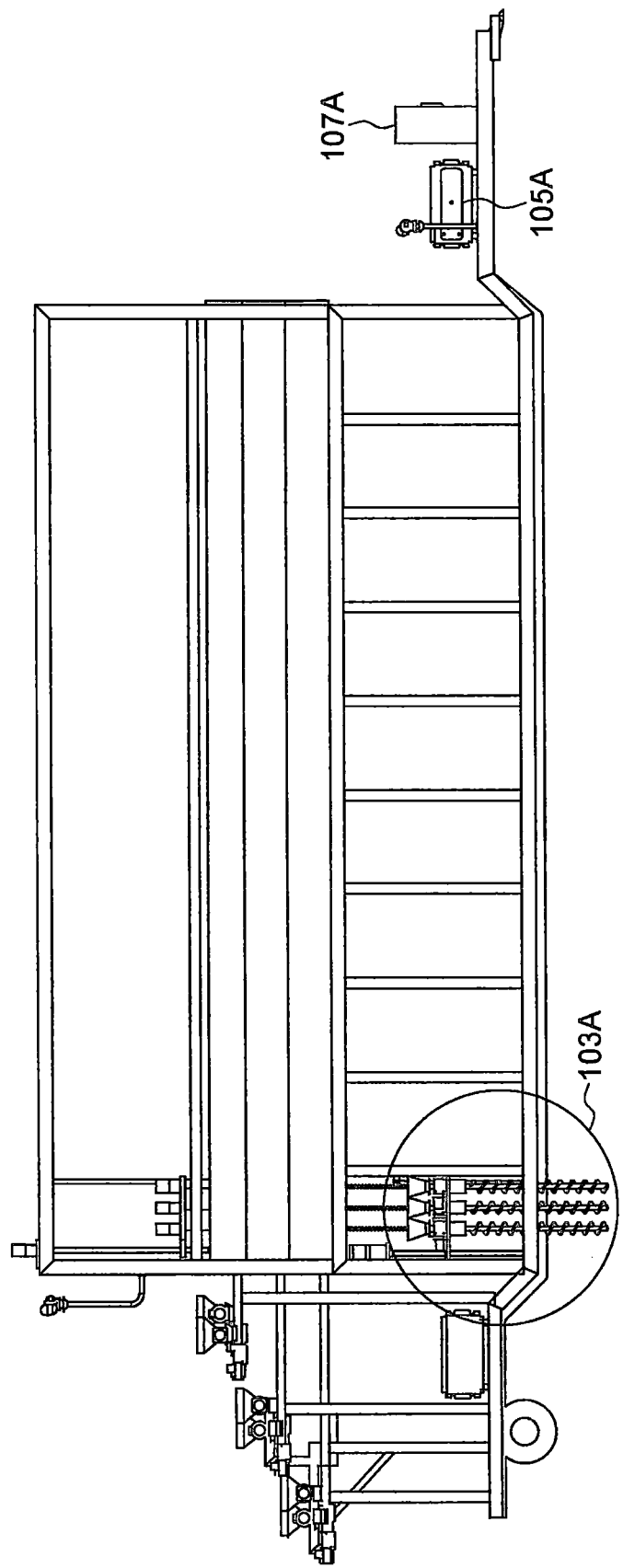

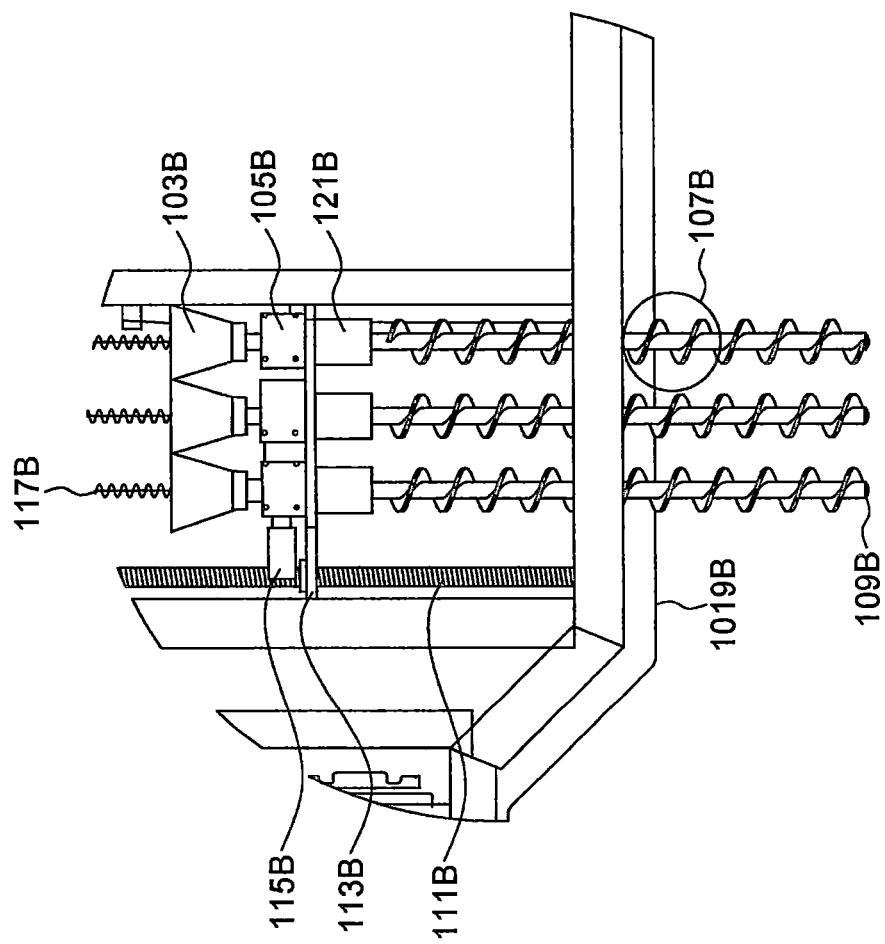

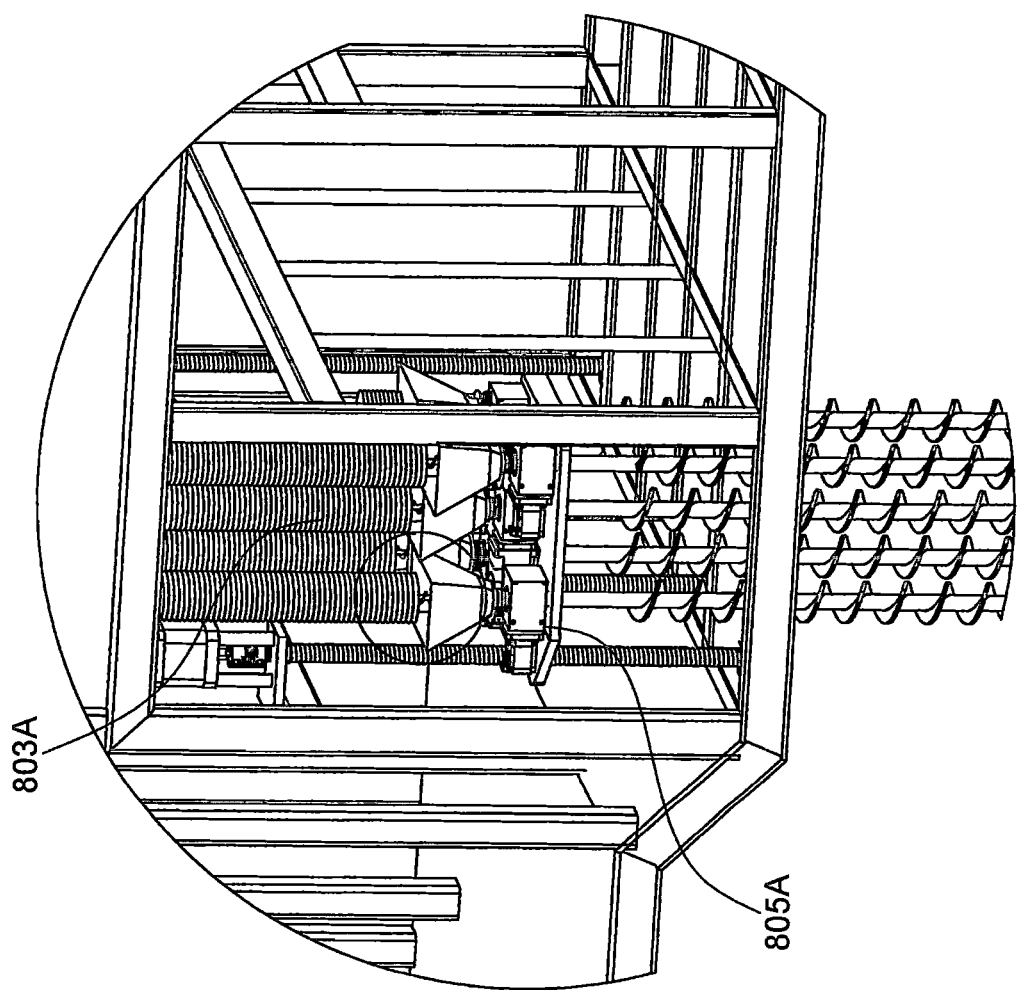

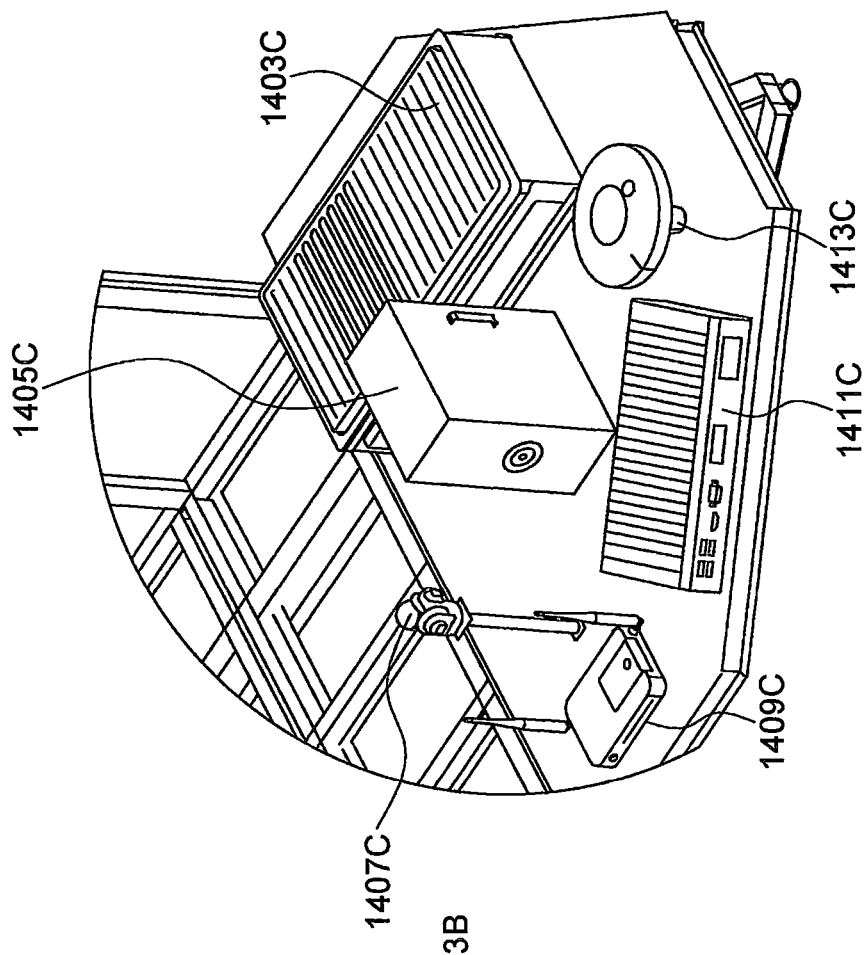
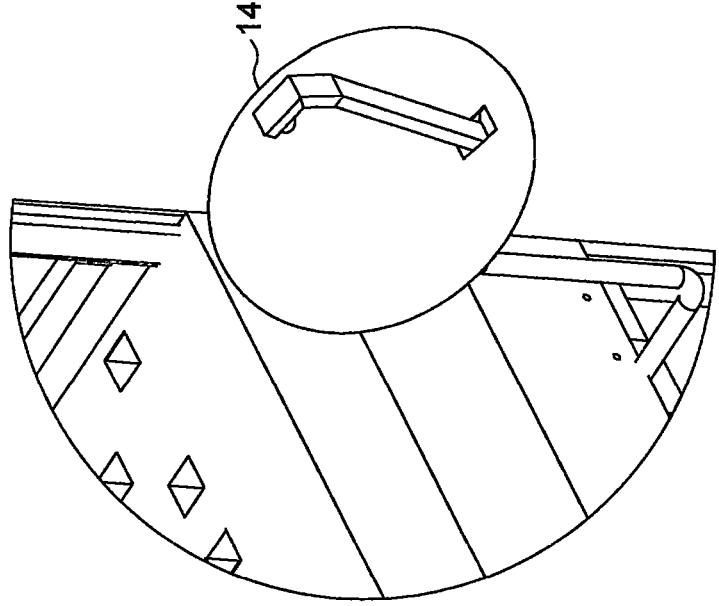
FIG. 14C
FIG. 14B

HOLLOW SHAFT DRILL BIT AND HOLLOW INSERT WITH PERFORATIONS OR SOLID FEEDER AUGER(S) AND PERFORATED HOLLOW SHAFT OR SOLID FLEXIBLE SCREW FEEDER AUGER(S)

TECHNICAL FIELD

The present invention is generally related to an auger within an auger and or hollow shaft drill bit and a sub-surface injection system. More particularly, the present disclosure relates to a hollow shaft drill bit and hollow insert with perforations or solid feeder augers and perforated hollow shaft or solid flexible screw feeder auger.

BACKGROUND

The subject matter discussed in the background section should not be assumed, to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over-or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, either organic/in-organic and/or non-organic matter, can be injected either for soil health or for water retention.

This specification recognizes that there is a need for an efficient apparatus that can inject down to various targeted root zone sections and/or at sub-rootzone soil horizons for soil health and hence enhanced yield and/or for water retention modification for drought resilience.

Soil amendments applying biochar of many varieties have been examined for crop yield and quality as well as for regulating nitrogen level imbalances due to increased fertilizer use, for pesticide dosage, et cetera.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing biochar or other soil amendment application rates, the literature discusses topsoil spreading and sometimes mechanical blending down as far as 30 centimeters with surface disruption; but there are no references in the art to provide multiple targeted releases through injection at and below the root zone with minimal surface disruption.

European patent application EP 1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines art internal passage with outlet apertures. A piston rod connected to each tine and a cylinder have a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

The present specification father recognizes that there is a need for blending soil amendment materials below the root zone and/or at desired targeted zones along the sub-surface root zone that does not currently exist.

There is an ever-increasing array of discrete amendments being tried to enhance soil health and/or productivity at the surface or near-surface soil horizons, as well as some rudimentary soil amendment spiking of soils.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

A hollow shaft drill bit and hollow insert with perforations or solid feeder augers and perforated hollow shaft or solid flexible screw feeder auger are provided substantially, as shown in and/or described in connection with at least one of the figures, as set forth more completely in the claims.

An aspect of the present disclosure relates to a hollow shaft drill bit and a solid or hollow shaft auger or a solid or perforated hollow shaft flexible screw feeder auger that includes a perforated hollow or solid shaft feeder auger or flexible screw feeder auger hollow insert with perforations or solid, a hollow shaft drilling auger, a flexible conveyor flight screws, a second perforated hollow shaft feeder auger, a programmable logic controller (PLC), an Artificial intelligence (AI) robot, a computer, an encoder, a plurality of limit switches, a feeder auger tube conduit, and a feeder auger motor. The solid or perforated hollow shaft flexible screw feeder auger is detachably attached to the hollow shaft drilling auger to receive vibration and torque that are dampened by a coupling or disc coupling between a platform and a gearbox interface. The flexible conveyor flight screws enable functions of the solid or a first perforated hollow shaft feeder auger to continue despite receiving torque. The feeder auger tube conduit comprises a distinct tube within a diameter of a feeder auger tube conduit. The distinct tube has a space between the distinct tube to contain one or more of a plurality of electrical wires and a plurality of other assembly items. The feeder auger motor upon receiving a signal from the AI robot, the computer, and the PLC enables the ascension of the feeder auger motor in concert with the encoder or limit switches. The feeder auger motor enables variable speeds controlled by an AI robot, computer, the PLC, and/or sensor in concert With a flight motor enabling volumes of materials to be ejected based on resistance determined by drill time and RPM measured by the encoder. The second perforated hollow shaft feeder auger through the signal from the encoder or limit switches rotates at pre-determined depths and sequentially places amendment constituent(s) through the AI robotic, the computer, the PLC, and a sensor programming of drill bit shaft loading and ejection.

In an aspect, the second perforated hollow shaft feeder auger enables injectability of dry and or wet constituents creating a broad array of methodologies to amend parcels of managed agricultural land, grasslands, contaminated sites, and even urban/suburban lots.

In an aspect, the second perforated hollow shaft feeder auger enables prescriptive amendment when efficacy requires deep layering of dry-state constituents with a layer(s) of humid or wet constituents above or below 30 cm depth by way of example but not limited to time-release fertilizers or pesticides.

In an aspect, the second perforated hollow shaft feeder auger is an auger within an auger with an internal auger being a ribbed helical auger or auger screw.

In an aspect, the second perforated hollow shaft feeder auger may rotate in concert with the hollow shaft drilling auger while descending.

In an aspect, the second perforated hollow shaft feeder auger may rotate in concert with the hollow shaft drilling auger while ascending.

In an aspect, the second perforated hollow shall feeder auger may rotate counter-clockwise to the hollow shaft drilling auger while descending.

In an aspect, the second perforated hollow shaft feeder auger rotates counter-clockwise to the hollow shaft drilling auger while ascending to enable the ejection of constituents.

In an aspect, the second perforated hollow shaft feeder auger through the limit switch or the encoder or lens assessment of the AI robot, wherein the data is transmitted to the computer, and the PLC to disperse specific volumes within a sequence of the amendment injection at specific depths.

In an aspect, the AI robot, the limit switches, and the encoders enable a gimbal, the computer, and the PLC to process a plurality of methodologies for injection.

In an aspect, the second perforated hollow shaft feeder auger enables a sequential loading of the constituents into the hollow drilling shaft.

In an aspect, the second perforated hollow shaft feeder auger enables the ejection of constituents by reversing the clockwise motion of the feeding auger.

In an aspect, the second perforated hollow shaft feeder auger enables the mixing of measured constituents with liquids, or pre-mixed liquids with measured colloids, dry, damp, and or moist constituents as specific prescriptive doses of injectables at targeted depths.

In an aspect, the second perforated hollow shaft feeder auger enables the re-loading of constituents into the hollow drill shaft at a specific depth.

In an aspect, the second perforated hollow shaft feeder auger enables prescriptive doses of injectables at targeted depths with efficacy through the mixing of measured constituents.

In an aspect, the second perforated hollow shaft feeder auger enables multiple particulate sizes to be injected into the hollow drill shaft.

In an aspect, the second perforated hollow shaft feeder auger enables its deployment via insertion traveling to the bottom of the hollow drill shaft opening.

In an aspect, the second perforated hollow shaft feeder auger enables its deployment for ejection of materials via insertion traveling past the bottom of the hollow drill shaft and an opened aperture.

In an aspect, the second perforated allow shaft feeder auger enables other related inventions by attachment.

In an aspect, the second perforated hollow shaft feeder auger is of a hollow shape for dispensing constituents.

In an aspect, the hollow shaft drill bit and the solid or hollow shaft auger or a solid or perforated hollow shaft flexible screw feeder auger includes a feeder auger shaft to enable dispensing of constituents through perforations at the specific curved lengths at corresponding depths using the right angles and gravity to dispense.

In an aspect, the second perforated hollow shaft feeder auger enables dispensing of constituents through perforations at the lower end of the hollow shaft drill bit and a sub-surface injection system.

In an aspect, the second perforated hollow shaft feeder auger enables continued operational efficacy because of the screw auger's flexible design.

In an aspect, the second perforated hollow shaft feeder auger enables mechanical manipulation visualized as an auger within an auger, to enhance constituent ejection by a motion of the injection drill bit in an opposite direction with the aid of the AI robot, computer, the PLC and or sensors.

In an aspect, the second perforated hollow shaft feeder auger enables soil porosity modification through its function of loading multiple shapes and sizes of solid constituents such as but not by way of limitation, aggregates affecting Bulk Mass Density of the targeted Horizon.

In an aspect, the second perforated hollow shaft feeder auger enables soil porosity modification through its function of loading of living Constituents such as but not by way of limitation, aneic earthworms to improve porosity by penetrating below the top soil.

In an aspect, the second perforated hollow shaft feeder auger placed above the hollow shaft injection drill bit may have shrouds and/or conduits for a constituent conveyance so they do not pollute the air when the hollow shaft injection drilling bit is being filled with the feeder auger and/or the feeder auger flexible conveyor wire screw.

Accordingly, one advantage of the present invention is that it enables AI robotic, computer, PLC, and or sensor modes of sequential loading and re-loading of constituents into a hollow shaft drill bit, subsequent insertion into the shaft of the hollow drill bit, and subsequent ejection within targeted depth or depths for constituent materials.

Accordingly, one advantage of the present invention is that it facilitates access to sub-root zone horizons as potential massive carbon sinks for certifiable carbon sequestration.

Accordingly, one advantage of the present invention is that it provides targeted injectability of dry and or wet constituents creating a broad array of methodologies to amend sub-optimal parcels of land.

Accordingly, one advantage of the present invention is that it provides prescriptive amendment when efficacy requires layering of dry-state constituents with a layer(s) of humid or wet constituents above or below by way of example but not by way of limitation, time-release fertilizers, or pesticides.

Accordingly, one advantage of the present invention is that it provides an ability to sequentially place amendment constituent(s) through AI robotically, computer, PLC, and or sensor programming of drill bit shaft loading and ejection.

Accordingly, one advantage of the present invention is that it provides an ability to AI Robotically, Computer, PLC, and/or Sensor aided dispersal of specific volumes within the sequence of the amendment injection.

Accordingly, one advantage of the present invention is that it provides AI robotically, computer, PLC, and/or sensor controls and process methodologies for injection.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 1A illustrates a view of an exemplary injection drilling trailer with detail of an array of an injection auger drill bit assembly, in accordance with at least one embodiment.

FIG. 1B illustrates a view of an example of the feeder auger assembly in FIG. 1A and detailed in reference numeral 117, also shown is an army of injection drill bits part of an injection auger drill bit assembly, in accordance with at least one embodiment.

FIG. 8A illustrates a view of an exemplary feeder auger array with a telescoping corrugated elastomer steel ring jacket almost fully extended, in accordance with at least one embodiment.

FIG. 14B illustrates a view of an exemplary satellite communications dish, in accordance with at least one embodiment.

FIG. 14C illustrates a view of an exemplary close-up of components within the circle of FIG. 14A and 1405A, in accordance with at least one embodiment.

DETAILED DESCRIPTION

Figure 2:
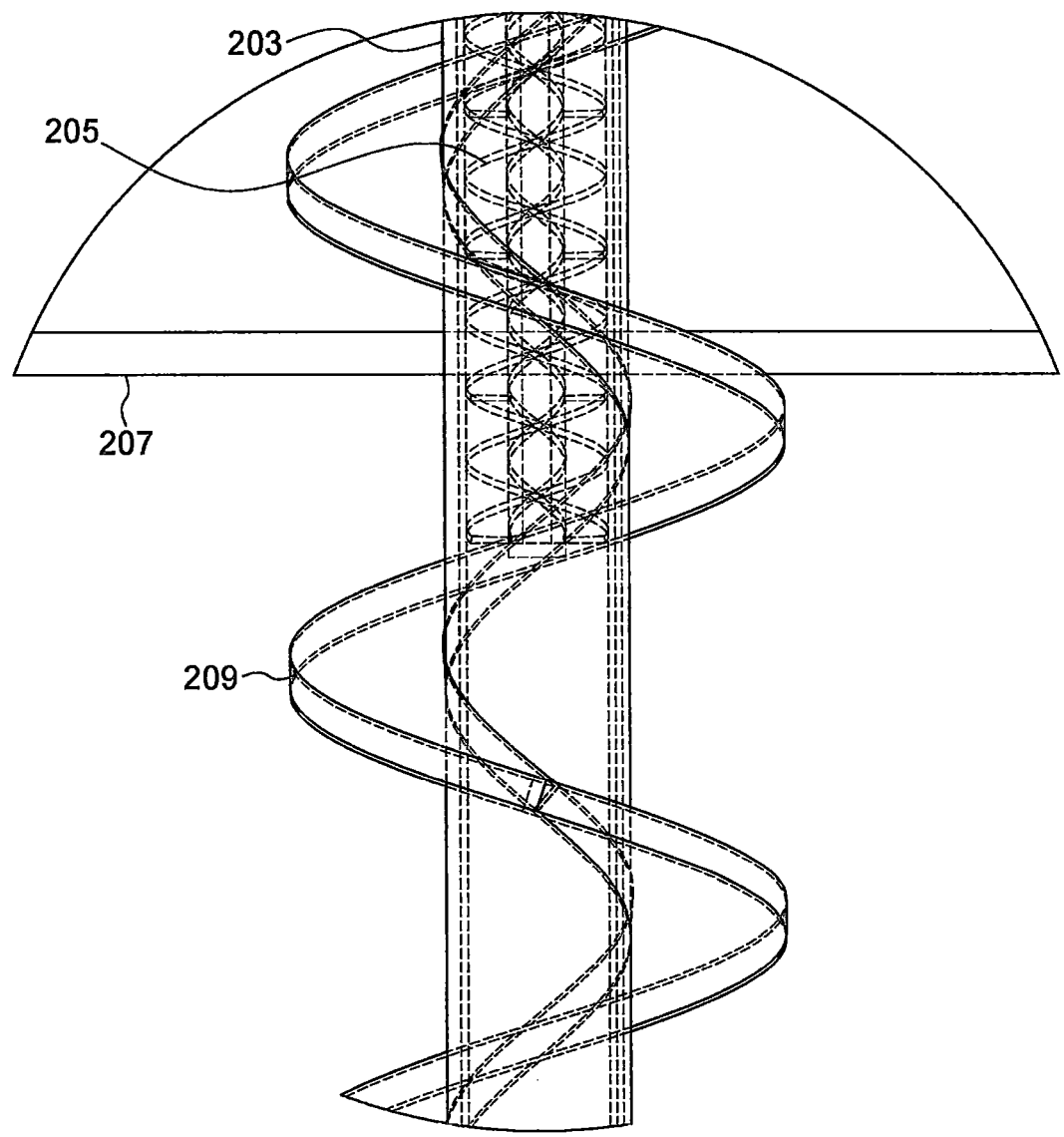
FIG. 2 illustrates a view of an exemplary transparent state of a hollow shaft drilling auger with descending feeding auger, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches a hollow shaft drill bit and a solid or hollow shaft auger or a solid or perforated hollow shaft flexible screw feeder auger.

According to a first embodiment of the present invention, it enables sequential loading of constituents into the hollow drilling shaft.

According to a second embodiment of the present invention, it enables the ejection of constituents by reversing the clockwise motion of the feeding auger.

According to a third embodiment of the present apparatus, it enables the mixing of measured liquids with liquids, or mixing liquids with measured colloids, dry, damp, and or moist Constituents as specific prescriptive doses of injectables at targeted depths.

According to a fourth embodiment of the present invention, it enables the re-loading of constituents into the hollow drill shaft at a specific depth.

According to a fifth embodiment of the present invention, it enables prescriptive doses of injectables at targeted depths efficacy through the mixing of measured Constituents.

According to a sixth embodiment of the present invention, it enables multiple particulate sizes to be injected into the hollow drill shaft.

According to a seventh embodiment of the present invention, it enables its deployment via insertion traveling to the bottom of the hollow drill shaft opening.

According to an eighth embodiment of the present invention, it enables its ascension in concert with the drilling augers ascension.

According to the ninth embodiment of the present invention, it enables other related inventions by attachment.

According to a tenth embodiment of the present invention, it provides a hollow version of the feeding auger, which enables dispensing of liquid constituents through perforations at the lower end of the device.

According to an eleventh embodiment of the present invention, it enables variable speeds controlled by AI Robotically, Computer, PLC, and or Sensor in concert with flight motor.

According to a twelfth embodiment of the present invention, it enables continued operational efficacy because of the augers flexible design.

According to a thirteenth embodiment of the present invention, it enables via artificial intelligence and or PLC enables sequential mixing volumes of constituents to be injected.

According to a fourteenth embodiment of the present invention, it enables mechanical manipulation visualized as an auger within an auger, to enhance constituent ejection by the motion of the injection drill bit in an opposite direction with the aid of the AI Robotically, Computer, PLC, and or Sensor and or sensors.

According to a fifteenth embodiment of the present invention, it increases the global inventory of arable land with appropriate porosity Constituents prescriptive for its ternary type. Porosity modification is a function of the shape and size of solid Constituents such as but not by way of limitation, aggregates affecting the Bulk Mass Density of the targeted horizon. Likewise living constituents such as but not by way of limitation, aneic earthworms can improve Porosity by penetrating below horizon A (as defined below).

DEFINITIONS

"Abrasives": means any Constituent capable of inhibiting smearing, By way of example but not limited Abrasives include walnut shells, pecan shells, and corn stover.

"Actuated": A device that causes a machine or other device to operate open or close and dispense a volume of material by way of example but not limited to a gate or valve opening or closing.

"Aerogel": an elastomer made of materials such as any combination of monomers or polymers filled with gas and vacated and subsequently vacated spaces that have a very low density compared to other elastomeric materials.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, pesticides, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Auger Array": A multiple of hollow shaft drilling injection drill bits or feeder augers sharing the same damping platform.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides by way of example but not limitation organophosphates, carbamates, or pyrethroids) and sometimes an additive (usually oil, sugar or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Cable Guide": A wire that can be contracted or let down via a motor whose winding guides and determines the length of the Elastomer Tube Jacket.

"Chemical": Means a compound or substance that has been purified or prepared, especially artificially for purposes of subsurface amendment, by way of example but not limited; to fertilizers, sorption materials like zeolites, fungicides, herbicides, and insecticides. A chemical can mean any basic substance which is used in or produced by a reaction involving changes to atoms or molecules by way of example but not limitation liquids, solids, or gases.

"Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a as. Colloids include, Examples of colloids include by way of examples but are not limited to the following fog, smoke, and foam.

"Constituent(s)": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, precursors to the eco colony, living organisms, inoculants, gas or any other material that can be injected subsurface to change the soil composition and or temperature. Constituents can mean chemical pesticides or natural biologic for unwanted pests. Solid constituents can be any polygonal shape, by way of example but are not limitation fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials.

"Copolymer": means Polymer constructed of two or more monomers.

"Copper Bands": The windings are flat copper strips to withstand the Lorentz force of the magnetic field. Electricity in the wire passes into the slip ring to make it into a magnet. A copper hand includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints—one fixed to each shaft—which are connected by a spindle, or third shaft. A flange within the drawings below or at the top of a gearbox is Disc Couplings.

"Corrugated": A design for material, surface, or structure) shaped into alternate ridges and grooves, that enable strength, with expansion or retraction.

"Damping": A decrease in the amplitude of an oscillation as a result of energy being drained from the system to overcome frictional or other resistive forces. For highly demanding drilling equipment, the stress on the dampers is particularly great, but this does not produce a problem for friction springs. The increased compressed air requirements and the high damping are ideal for such applications. Furthermore, the increased reliability of friction springs by virtue of their design is a decisive advantage over other damping systems. In this case, the friction spring does not only provide for energy absorption but also compensates for clearances that may occur between the individual components during continuous operation. Can refer to the equipment platform, where the substrate is materials by way of example but not limitation granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances.

"Drill Bit" or "Drill Bit Tip": Any device capable of making a subsurface hole when connected to a power source with perforation holes or apertures, which may be any polygon with equal or unequal side lengths, and is manufactured from alloys, steel, titanium, manganese or other materials. The drill bit may contain industrial diamonds for sub-surface injection cavity creation.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Elastomer": High molar mass material that when deformed at room temperature reverts quickly to nearly original size and form when the load causing the deformation has been removed (ISO 1382:1996). Within this patent, the word Elastomer can mean any Elastomeric material by itself or combined with concrete, aggregate solids, or carbon fiber. Elastomeric materials when referred to within this patent are interchangeable. Some materials that are elastomer, but not limited to the following, examples are aerogel, graphene aerogel, aerourapher, monomer, polymers, homopolymers, copolymers, rubber, natural rubber, silicone and silicone gel, synthetic rubber, vulcanization, cross-linking, thermoplastic elastomer, and rubber types.

"Elastomer Tube. Jacket or Feeder Auger Flexible Flight Conduit Outer Tubes" or "Flight Conduit Outer Tubes": A expandable or retractable corrugated elastomer jacket covering the feeder auger. Jacket motors are AI Robotically, Computer, PLC, and or Sensor controlled. Jacket Tubes may be made of UHMWPE (ultra-high molecular weight polyethylene) or polypropylene construction. The extremely smooth interior surface of UHMWPE adds additional protection from cross-contamination. For embodiments requiring even greater resistance to material contamination, and long-term wear resistance, NBE Type 304 stainless steel Conduit outer tubes, and NBE carbon steel Conduit outer tubes assure performance, with demanding process constituents, duty cycles, or both.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the Plunger Panel that holds Plunger Panels in shut-stacked, deployed, or in the right position and attached to the motor shaft.

"Feeder Auger or Feeder Auger Flexible Conveyor Wire Screw": Examples of feeder augers that feed the materials to the drilling auger or its drilling inner tube, include feeder flexible conveyor flight screws, flexible conveyor flight beveled round wire screws, flexible conveyor flight beveled square wire screws, flexible conveyor flight beveled wire screws, and flexible conveyor flight flat wire screws. All feeder auger flexible flight conveyor screws have an external feeder auger conduit tube.

"Feeder Auger Conduit Tubes": A component of a feeder auger, Flexible Conveyor Flight Beveled Round Wire Screw, Flexible Conveyor Flight Beveled Square Wire Screws, Flexible Conveyor Flight Beveled Wire Screws, and Flexible Conveyor Flight Flat Wire Screws, which are used for and made of "Polypropylene": For applications requiring high-volume conveying, or conveying of larger materials. Polypropylene outer tubes provide large-diameter tithe construction to accommodate the application-appropriate flexible conveyor screw outside diameter and flight design. Polypropylene tube is non-bending and is typically used in runs of up to 30 feet "UHMWPE": For applications requiring exceptional operating durability and performance, flexible screw conveyor outer tubes are constructed of ultra-high molecular weight polyethylene (UHMWPE). These UHMWPE outer tubes have the highest impact strength and tensile strength of any thermoplastic outer tube; non-corrosive, and temperature resistant. UHMWPE outer tubes can bend to a radius as tight as 6 feet; enabling the conveying tube to run around obstacles. UHMWPE outer tubes are used typically in lengths up to 40 feet. "Stainless Steel": For applications requiring excellent corrosion resistance and cross-contamination resistance, Type 304 stainless steel outer tubes are nearly impervious to most conveyable materials. Stainless steel outer tubes also have an inherent rigidity that enables longer runs between supports than UHMWPE. "Carbon Steel": For applications requiring very high tube strength, beyond even that of UHMWPE; but where the exceptional corrosion resistance and regulatory compliance of stainless-steel tube are not required a high-performance alternative.

"Flange": A projecting flat rim, collar, or rib on an object, serving to strengthen or attach. A flange is a rib or rim for strength, for guiding, or for attachment to another object. Where a flange appears in a drawing associated with a hollow shaft injection drill bit can also mean a Gear Box Coupling and or Gear Box Disc Coupling.

"Flexible Conveyor Flight Beveled Round Wire Screws": For applications where material flow is typically semi-free flowing to sluggish flowing, and material characteristics are highly abrasive, granular, flake, pellet, or irregular shape; the round bar wire screw provides excellent conveying of materials by way of example but not limitation: fine granules, zeolites, small bean-like pellets, and polymer regrind.

"Flexible Conveyor Flight Beveled Square Wire Screws": For applications where the material flow can be free-flowing, semi-free flowing, or sluggish, and material characteristics are highly abrasive, with high bulk density; the square bar wire screw provides highly efficient conveying of materials by way of example but not limitation: sand, heavy density powders, and large biochar.

"Flexible Conveyor Flight Beveled Wire Screws": For applications where material flow is typically semi-free flowing to sluggish flowing, and material characteristics are sticky, with tendencies to pack, smear, cake, or crumble; the beveled wire screw may have a wide-face design for conveying of materials by way of example but not limitation: iron oxide, zinc oxide, powders, and carbon black.

"Flexible Conveyor Flight Flat Wire Screws": For applications where material flow is typically free-flowing to semi free-flowing, and material characteristics are lightweight, highly aerated, powdered, or fluidizing; the flat wire screw may have a wide-face design for conveying of materials by way of example but not limitation: calcium carbonate, fumed silica, and biochar fines.

"Flight Conduit Outer Tubes" or "Flight Tube" or "Conduit Tube": Within this space, a separate channel such as a smaller diameter or perimeter tube is incorporated into the sidewall or an appendix to a conduit tube.

"Friction Spring": Friction springs consist of precisely manufactured outer and inner rings which touch each other on their tapered faces. Friction springs are indispensable safety components in all fields of technology where suddenly occurring forces have to be taken up and kinetic energy absorbed, or where springs are required with relatively compact dimensions while also being able to sustain high forces. Friction springs are needed when it comes to the deceleration of moving masses in a quick, safe, and precise manner.

"Fuel Cell": A cell producing an electric current directly from a chemical reaction. Or may also refer to a rechargeable battery.

"GPS" "Global Positioning Satellite": An accurate worldwide navigational and surveying facility based on the reception of signals from an array of orbiting satellites.

"Ground Level": If something is at ground level, it is at the same level as the soil, rock, or water surface, as opposed to being higher up or below the surface.

"Hollow Shaft Channel": Any injection auger and or drill bit space between the walls, space may be cylindrical or any polygonal shape. Within this space, a separate channel such as a smaller diameter or perimeter tube is incorporated into the sidewall or an appendix to a flight conduit outer tube.

"Hollow Shaft of Injection Drilling Auger Array" or "Hollow Shaft of injection Drilling Auger Array Member": A helical and/or corkscrew and has multiple parts: collar, bottom aperture, window aperture, spillway, perforations, wings, screw, spurs, cutting edges, twist, shank. Expansive auger bits have adjustable blades with cutting edges and spurs that can be extended radially to cut large boles.

"Homopolymer": means Polymer constructed of only one kind of monomer.

"Hopper": A container for a bulk material by way of example but not limited to injectable constituents, typically one that tapers downward and can discharge its contents at the bottom or a side panel.

"Injection Drill Bit": Any hollow shaft device of any polygonal width or diameter that is capable of penetration of ice, soil, rock, and or mineral.

"Inoculants": A constituent (a virus or toxin or immune serum) that is introduced into the subsurface of soil to produce or increase immunity to an undesirable living organism.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A limit switch can refer to a plurality.

"Living Organisms": An individual form of life, by way of example but not limitation a bacterium, protist, fungus, plant, or animal, composed of a single cell or a complex of cells in which organelles or organs work together to carry out the various processes of life, including in some circumstances virus.

"Magnetic Metals": Include ferromagnetic metals by way of example but not limited to iron, nickel, cobalt, gadolinium, dysprosium, and alloys by way of example but not limitation steel that also contain specific ferromagnetic metals such as iron or nickel.

"Minerals": A solid chemical compound with fairly well-defined chemical composition and a specific crystal structure that occurs naturally in pure form.

"Monomer": means Low molar mass molecules which can react with the same or a different kind of monomers, thus composing a polymer.

"Natural Rubber": means Cis-1,4-polyisoptene obtained from the latex of the rubber tree, most frequently from Hevea Brasiliensis plants.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types of a pure substance that cannot be broken down into other types of substances; lipid organic compound such as fat or oil; matter is anything that takes up space and has mass; monosaccharide simple sugar such as glucose that is a building block of carbohydrates; nucleic acid organic compound such as DNA or RNA; nucleotide.

"Platform": A ledge or shelf with damping.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer or remote Cloud computer.

"Polygon": a plane figure with at least three straight sides and angles, and typically five or more.

"Polymer": means Macromolecules constructed by the repetition of primary monomer units in such a way that the properties of the material do not change significantly due to the insertion or removal of some primary units.

"Porosity Soil or Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Router": is a network hardware device equipped with a cellular hot spot that allows making communication between the internet and all devices which are linked to the internet in your house and office. The router has responsible to receives, analyze, and forwarding all data packets from the modem and transferring it to the destination point.

"Rubber": means Cross-linked, vulcanized elastomer free of solvent which contracts to its 1.5-fold original length in one minute after the tension which has stretched the rubber to double length at room temperature has been released.

"Rubber type": means a group of rubber elastomers having the same kind of characteristics and enabling the same applications for products made of that group of elastomers.

"Rubber quality": means a vulcanized mixture of rubber satisfying a certain set of quality requirements.

"Satellite Dish": a bowl-shaped antenna with which signals are transmitted to or received from a communications satellite.

"Silicone and Silicone Gel": means a material that has shear characteristics of specially for silicone elastomers. These characteristics allow the energy absorption and return spring functions efficacy.

"Slip Ring or Slip Ring Bore Hole": a ring in a dynamo or electric motor which is attached to and rotates with the shaft, passing an electric current to a circuit via a fixed brush pressing against it. A Slip Ring with a hollow shaft creates a borehole for an injection drill bit shaft.

"Sorption or Sorbents" Are Constituents capable of adsorbing/absorbing one or more constituents in gas, fluid, liquid, or a mixture thereof. Examples include activated carbon, atomic particles, biochar, carbon materials, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, by way of example but not limitation, are carbon materials, that have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents, by way of example but not limited to Bio-Char and Zeolites.

"Steel Ring": Metal reinforcement in Elastomer Tube Jacket.

"Subsoil": is the layer of soil below the topsoil. The layer of soil closest to our feet is topsoil. Geologists refer to it as the "A" horizon, Whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Synthetic Rubber": means Rubber that has been produced by polymerizing one or more monomers.

"Telescoping Corrugated Elastomer Steel Ring Jacket": AI Robotically, Computer, PLC, and or Sensor controlled corrugated version of Elastomer Tube Jacket.

"Thermoplastic Elastomer": Thermoplastic elastomers are in many respects a rubber-like material that need not be vulcanized. The rubbery character disappears at the processing temperature but returns when the material has reached the operating temperature.

"Vulcanization, cross-linking": means an irreversible process in which the rubber compound is transformed in a chemical reaction (e.g., cross-linking) into a three-dimensional network that preserves its elastic characteristics over a wide temperature range. The term vulcanization is connected with the use of Sulphur and its derivatives, whereas the term cross-linking is usually connected with Sulphur-free processes.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates a view of an exemplary injection drilling trailer with detail of an array of an injection auger drill bit assembly, in accordance with at least one embodiment. FIG. 1A depicts call out for close up as seen in FIG. 1B 103A, fuel cell ai robotically, computer, plc, and or sensor power source 105A, and AI robotically, computer, plc, and or sensor 107A.

FIG. 1B illustrates a view of an example of the feeder auger assembly in FIG. 1A and detailed in reference numeral 117, also shown is an array of injection drill bits part of an injection auger drill bit assembly, in accordance with at least one embodiment. FIG. 1B depicts a hopper 103B, a gear box 105B, injection non-perforated drilling bit sub surface view 107B, auger hollow shaft injection drilling bit 109B, a lead screw for 113B damping platform 111B, damping platform 113B, injection drilling auger motor 115B, feeder auger 117B, ten inches above ground level 119B, and disc coupling 121B.

FIG. 2 illustrates a view of an exemplary transparent state of a hollow shaft drilling auger with descending feeding auger, in accordance with at least one embodiment. FIG. 2 depicts an external shaft of injection drilling bit 203, descending feeding auger inside the hollow shaft of injection drilling bit 205, ground level 207, and a rib on the external s of injection drilling auger below the ground state 209.

Figure 3A:
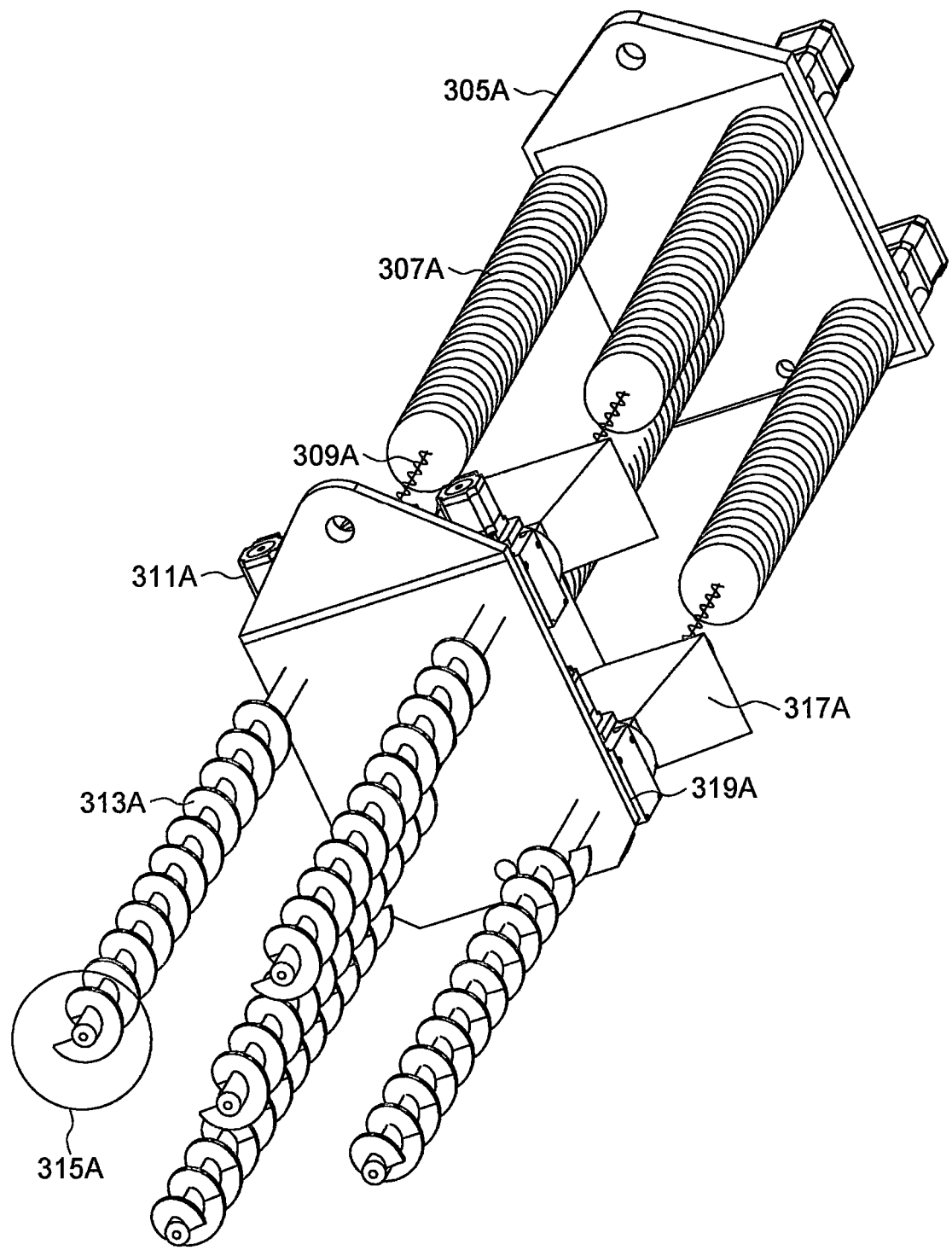
FIG. 3A illustrates a view of an exemplary drill bit injection assembly with hoppers, shrouds, and a call out of the detail of the bottom of the drill bit with an internal feeder auger and spring-loaded bottom cover, in accordance with at least one embodiment.

FIG. 3A illustrates a view of an exemplary drill bit injection assembly with hoppers, shrouds, and a call out of the detail of the bottom of the drill bit with an internal feeder auger and spring-loaded bottom cover, in accordance with at least one embodiment. FIG. 3A depicts a friction spring damping platform 305A, an elastomer jacket for feeder auger 307A, a feeder auger 309A, and a motor for hollow shaft injection drilling auger 311A, a hollow shaft injection drilling auger 1 of 5 within an array 313A, call out for close up in FIG. 3B 315A, hopper 317A, and a friction spring damping platform 319A.

Figure 3B:
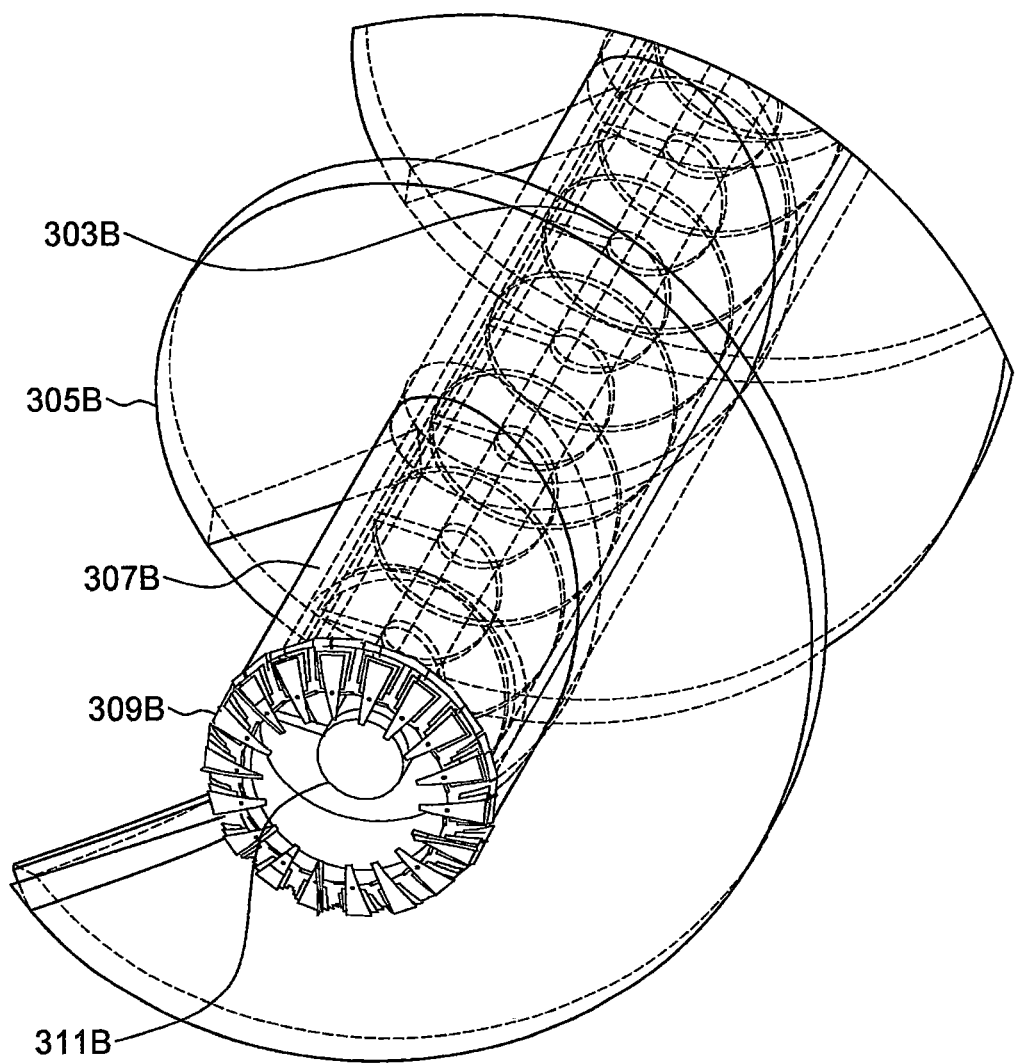
FIG. 3B illustrates a view of an exemplary transparent illustration of FIG. 3A and reference numeral 315A drill bit injection assembly with hoppers, shrouds, and a call out of the detail of the bottom of the drill bit with an internal feeder auger and spring-loaded bottom cover, in accordance with at least one embodiment.

FIG. 3B illustrates a view of an exemplary transparent illustration of FIG. 3A and reference numeral 315A drill bit injection assembly with hoppers, shrouds, and a call out of the detail of the bottom of the drill bit with an internal feeder auger and spring-loaded bottom cover, in accordance with at least one embodiment. FIG. 3B depicts a feeder auger within hollow shall injection drilling auger 303B, a hollow shaft injection drilling auger rib 305B, a hollow shaft of injection drilling auger 307B, an open aperture 309B, and an end tip or stopper of feeder auger within hollow shaft injection drilling auger 311B.

Figure 4A:
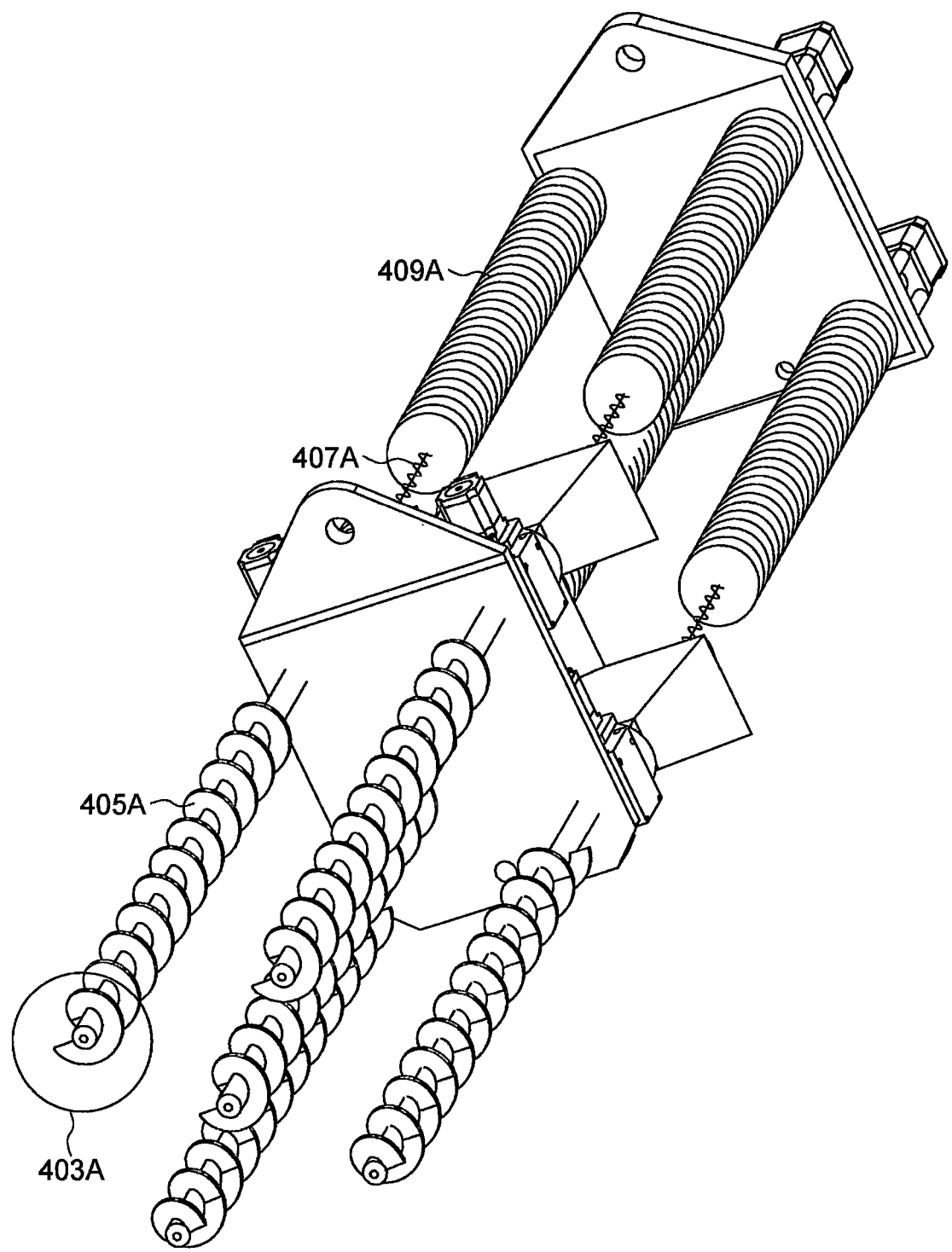
FIG. 4A illustrates a view of an exemplary drill bit injection assembly with hoppers, shrouds, and a call out of the detail of the bottom of the drill bit with an internal feeder auger and spring-loaded bottom cover, in accordance with at least one embodiment.

FIG. 4A illustrates a view of an exemplary drill bit injection assembly with hoppers, shrouds, and a call out of the detail of the bottom of the drill bit with an internal feeder auger and spring-loaded bottom cover, in accordance with at least one embodiment. FIG. 4A depicts a call out of a close-up of FIG. 4B 403A, a rib of injection drilling auger rib 405A, a feeder auger 407A, and an elastomer tube jacket 409A.

Figure 4B:
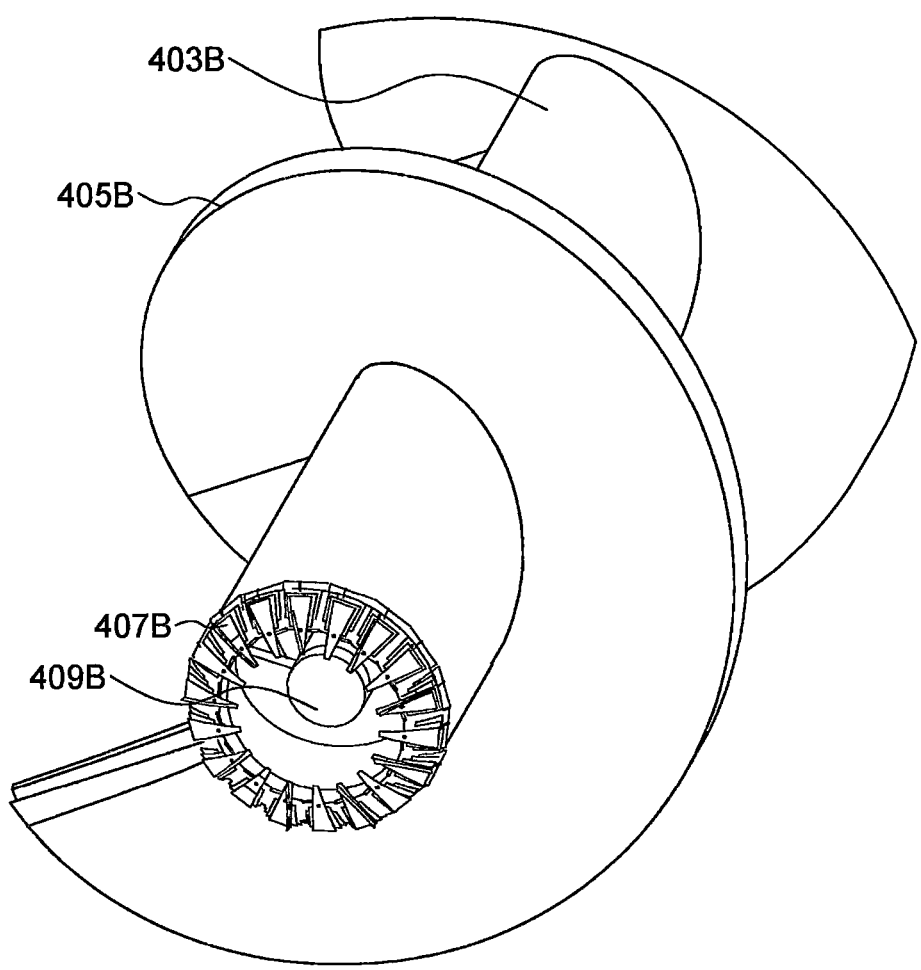
FIG. 4B illustrates a view of an exemplary illustration of FIG. 4A and reference numeral 403A drill bit injection assembly with hoppers, shrouds, and a call out of the detail of the bottom of the chill bit with internal feeder auger completed with spring-loaded bottom cover and feeder auger ejection stopper, in accordance with at least one embodiment.

FIG. 4B illustrates a view of an exemplary illustration of FIG. 4A and reference numeral 403A drill bit injection assembly with hoppers, shrouds, and a call out of the detail of the bottom of the drill bit with internal feeder auger completed with spring-loaded bottom cover and feeder auger ejection stopper, in accordance with at least one embodiment. FIG. 4B depicts a hollow non-perforated stem injection drilling auger 403B, a hollow non-perforated stem injection drilling auger rib 405B, an aperture with the spring-loaded cap of hollow non-perforated stem injection drilling auger 407B, and deployed stopper at the tip of feeder auger 409B.

Figure 5A:
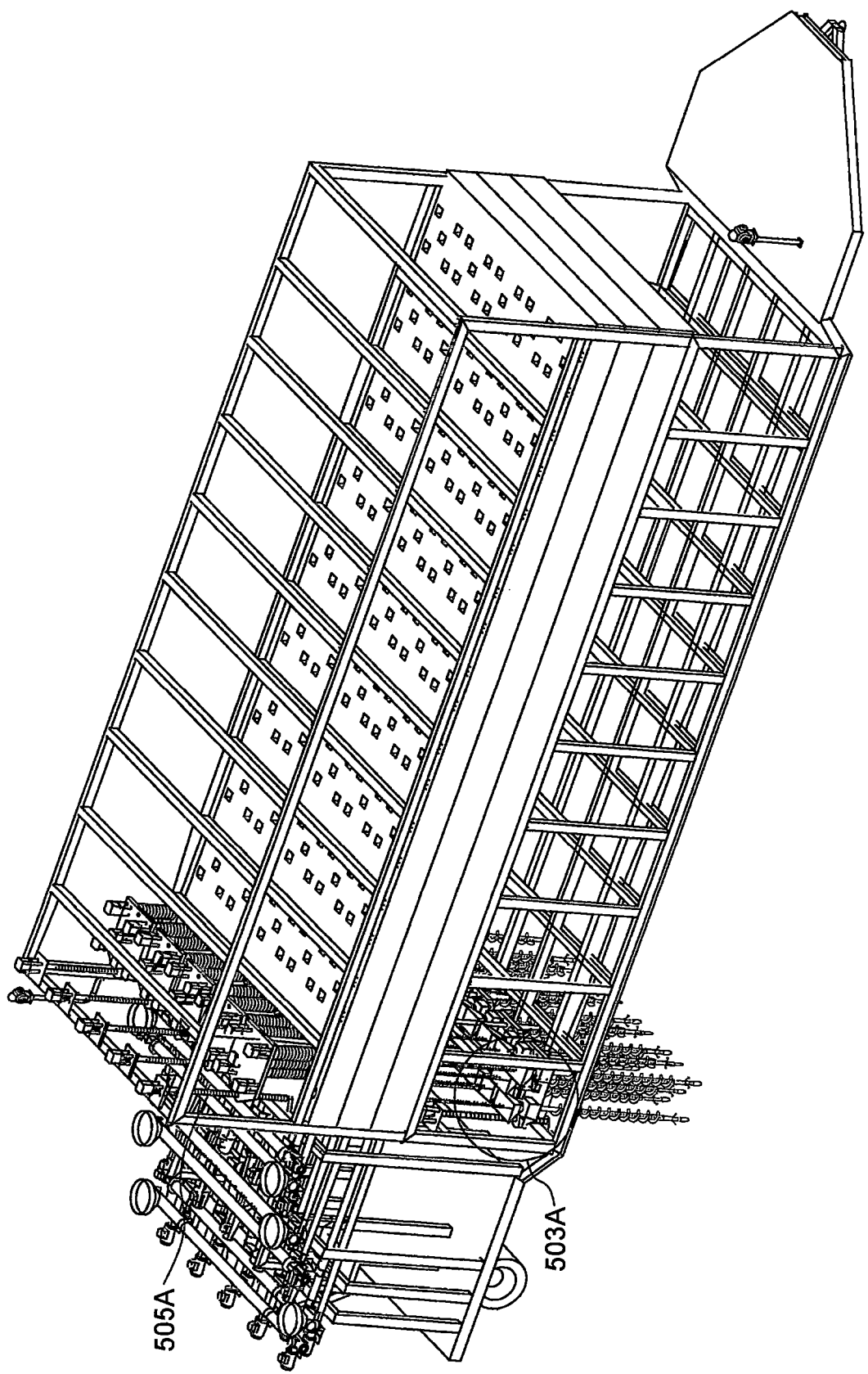
FIG. 5A illustrates a view of an exemplary injection drilling trailer with detail of an array of a feeder auger assembly, in accordance with at least one embodiment.

FIG. 5A illustrates a view of an exemplary injection drilling trailer with detail of an array of a feeder auger assembly, in accordance with at least one embodiment. FIG. 5A depicts a close-up of the drilling array for FIG. 5B (503A) and a feeder auger lead screw 505A.

Figure 5C:
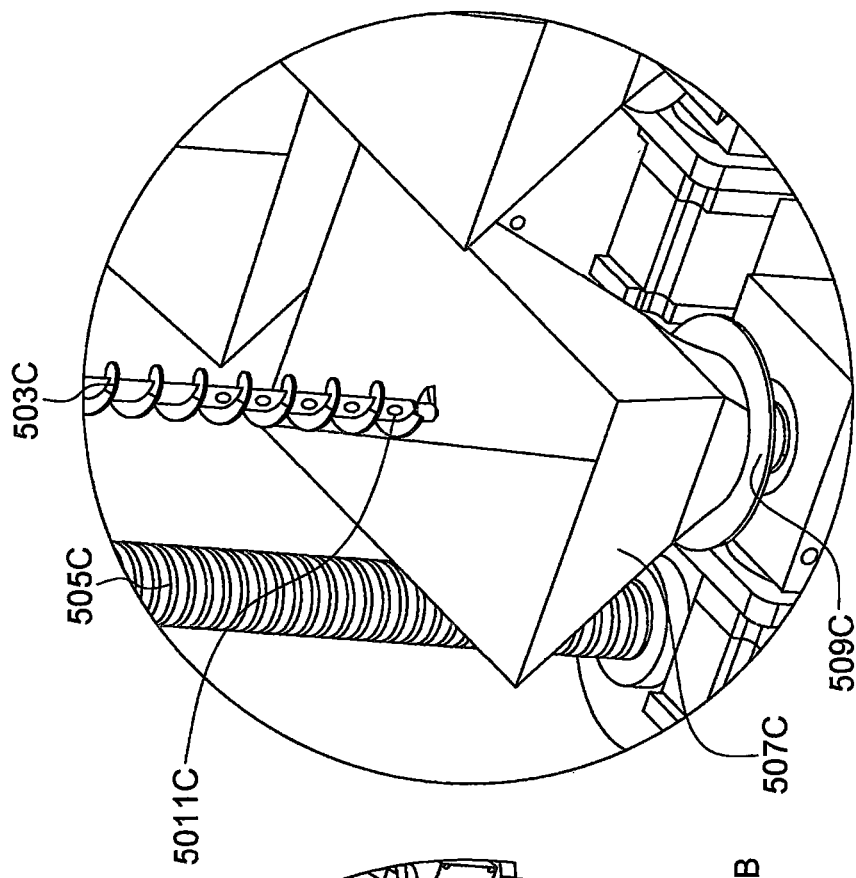
FIG. 5C illustrates a view of an exemplary close-up of FIG. 5B and reference numeral 507B showing a constituent hopper, flange, vertical platform control screw, and hollow shaft feeder auger with perforations, in accordance with at least one embodiment.
Figure 5B:
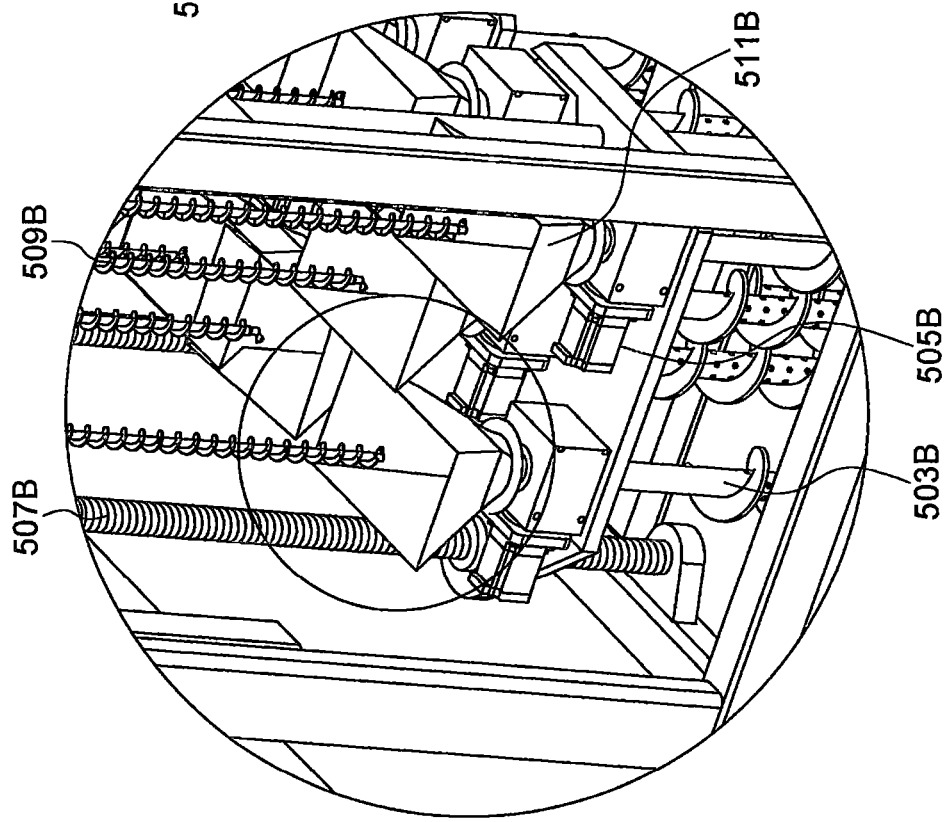
FIG. 5B illustrates a view of an exemplary close-up of FIG. 5A and reference numeral 503A showing a constituent hopper, gearbox, motor, and feeder auger, in accordance with at least one embodiment.

FIG. 5B illustrates a view of an exemplary close-up of FIG. 5A and reference numeral 503A showing a constituent hopper, gearbox, motor, and feeder auger, in accordance with at least one embodiment. FIG. 5B depicts a hollow shaft injection drill bit motor 503B, a hollow shaft injection drill bit 505B, a lead screw for hollow shaft injection drill bit 507B, a feeder auger before insertion 509B, and a hopper 511B.

FIG. 5C illustrates a view of an exemplary close-up of FIG. 5B and reference numeral 507B showing a constituent hopper, flange, vertical platform control screw, and hollow shaft feeder auger with perforations, in accordance with at least one embodiment. FIG. 5C depicts a hollow shaft feeder auger 503C, a perforation hollow shaft feeder auger 505C, hopper 507C, friction spring flange 509C, and feed auger lateral perforations 511C.

Figure 6A:
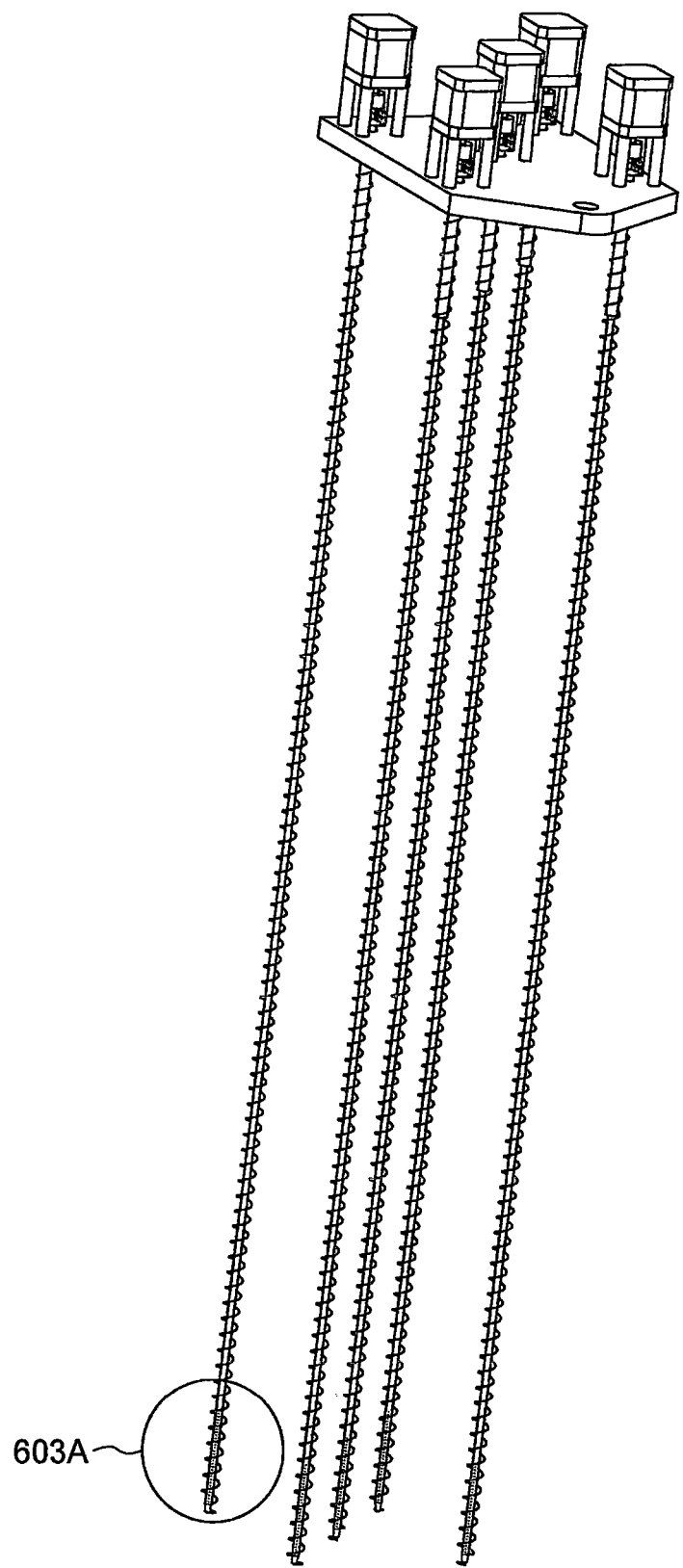
FIG. 6A illustrates a view of an exemplary array of hollow shaft feeder augers, in accordance with at least one embodiment.

FIG. 6A illustrates a view of an exemplary array of hollow shaft feeder augers, in accordance with at least one embodiment. FIG. 6A depicts a call-knit for FIG. 6B close up of perforated hollow shaft feeder auger 603A.

Figure 6B:
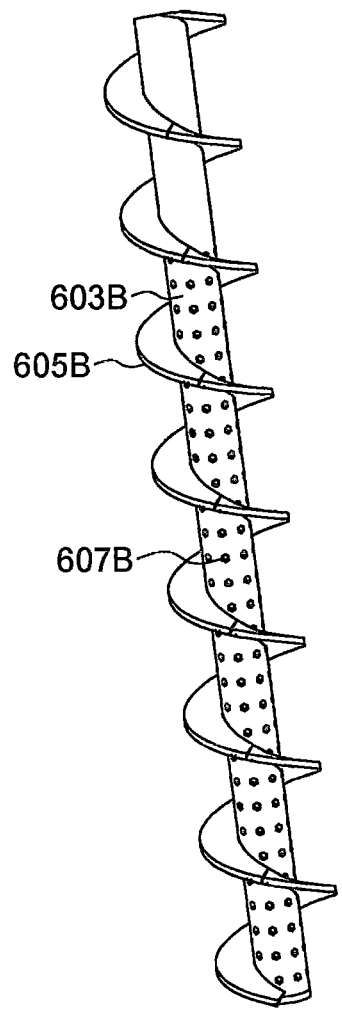
FIG. 6B illustrates a view of an exemplary section of hollow shaft feeder augers, in accordance with at least one embodiment.

FIG. 6B illustrates a view of an exemplary section of hollow shaft feeder augers, in accordance with at least one embodiment. FIG. 6B depicts the external wall of hollow feeder auger flight shaft 603B, rib of hollow feeder auger flight shaft 605B, and perforation of hollow feeder auger flight shaft 607B.

Figure 7A:
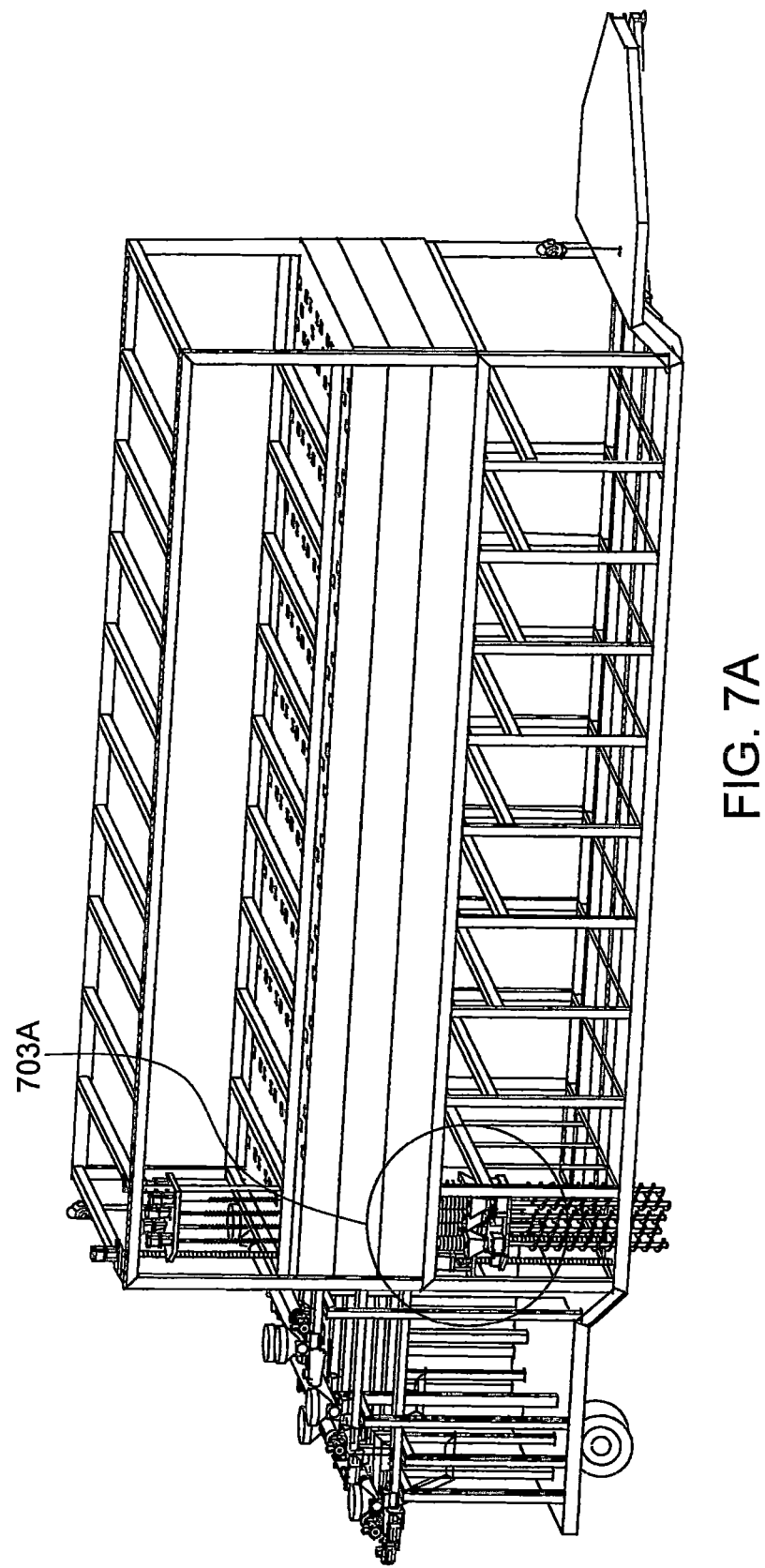
FIG. 7A illustrates a view of an exemplary view of feeder auger arrays interfacing with injection drill bit array, in accordance with at least one embodiment.

FIG. 7A illustrates a view of an exemplary view of feeder auger arrays interfacing with injection drill bit array, in accordance with at least one embodiment. FIG. 7A depicts feeder auger arrays 703A.

Figure 7B:
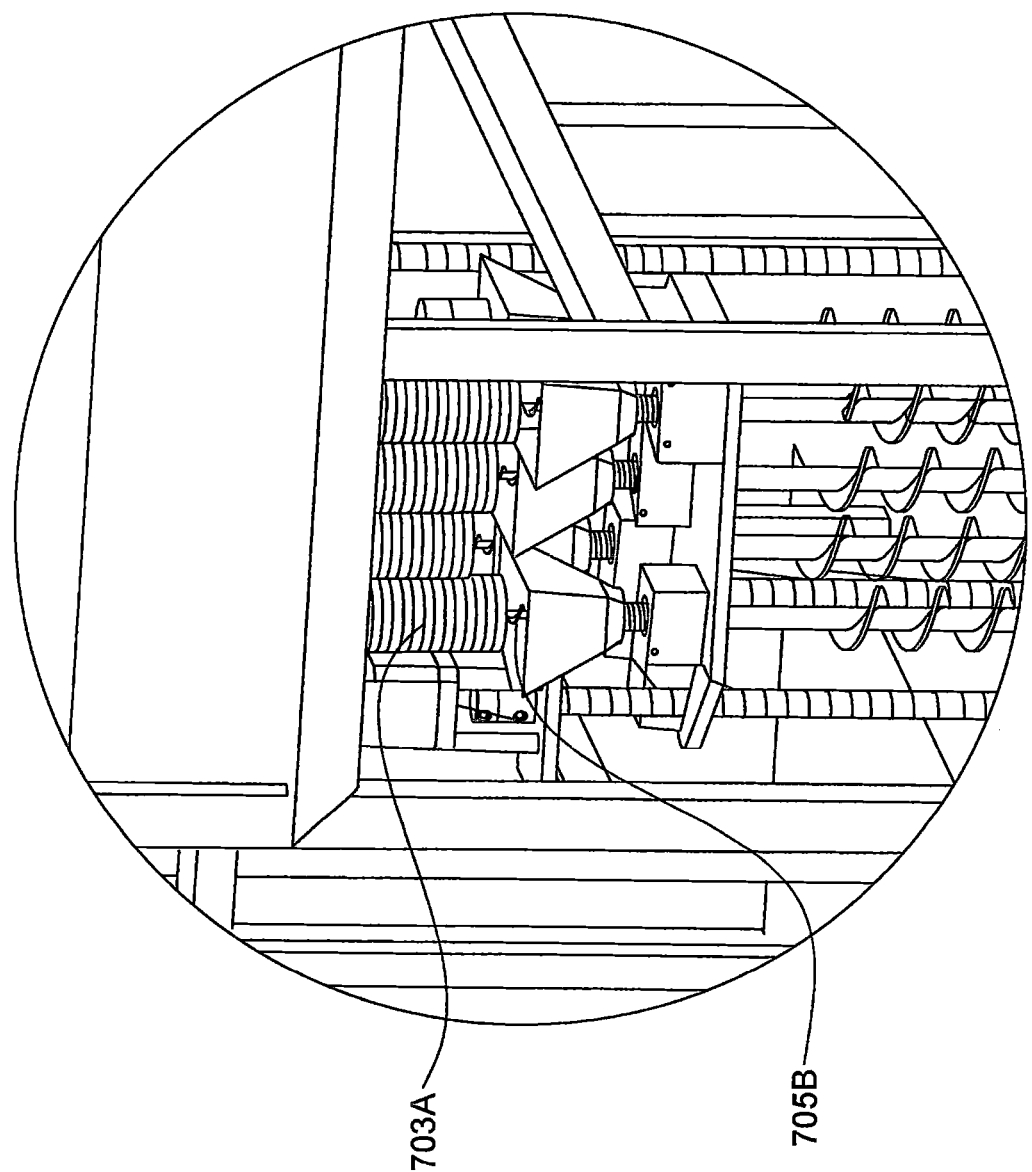
FIG. 7B illustrates a view of an exemplary close-up of FIG. 7A, in accordance with at least one embodiment.

FIG. 7B illustrates a view of an exemplary close-up of FIG. 7A, in accordance with at least one embodiment. FIG. 7B depicts telescoping corrugated elastomer steel ring jacket 703B, and feeder auger 705B.

FIG. 8A illustrates a view of an exemplary feeder auger array with a telescoping corrugated elastomer steel ring jacket almost fully extended, in accordance with at least one embodiment. FIG. 8A depicts a feeder auger with telescoping corrugated elastomer steel ring jacket 803A, and injection drill hit array 805A.

Figure 8B:
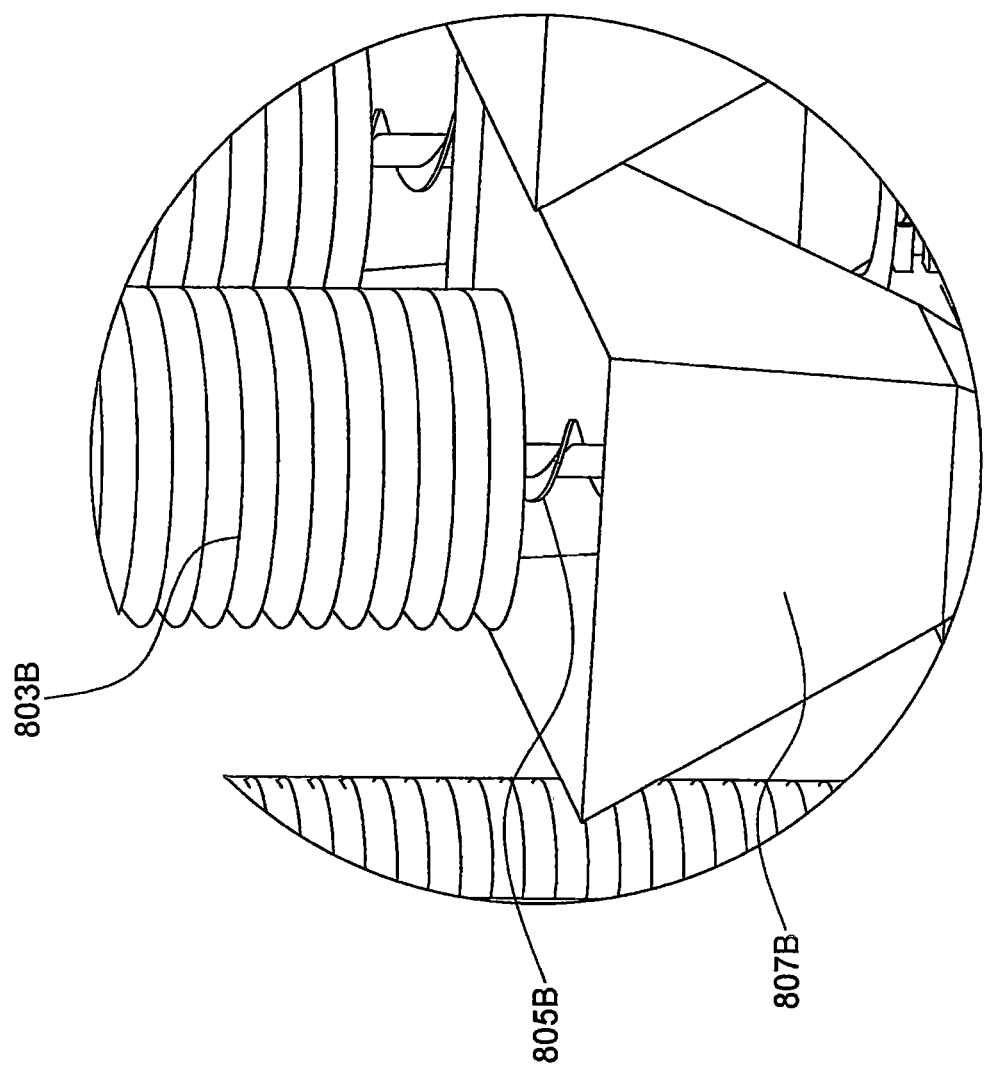
FIG. 8B illustrates a view of an exemplary closeup of feeder auger array with telescoping corrugated elastomer steel ring jacket almost fully extended, in accordance with at least one embodiment.

FIG. 8B illustrates a view of an exemplary closeup of feeder auger array with telescoping corrugated elastomer steel ring jacket almost fully extended, in accordance with at least one embodiment. FIG. 8B depicts feeder auger telescoping corrugated elastomer steel ring jacket 803B, feeder auger 805B, and injection drill bit hopper 807B.

Figure 9A:
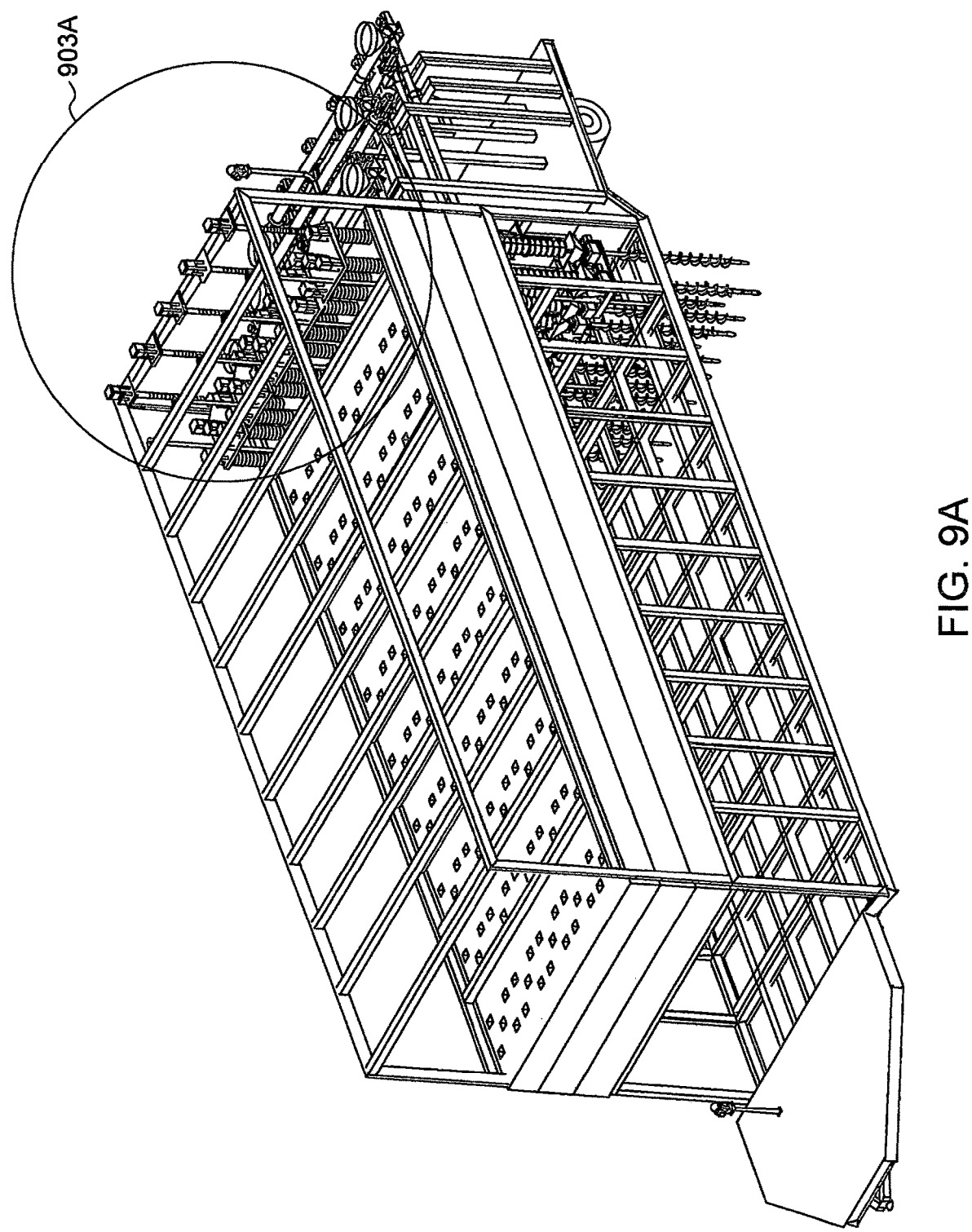
FIG. 9A illustrates a top view of an exemplary feeder auger array with telescoping corrugated elastomer steel ring jackets, in accordance with at least one embodiment.

FIG. 9A illustrates a top view of an exemplary feeder auger array with telescoping corrugated elastomer steel ring jackets, in accordance with at least one embodiment. FIG. 9A depicts call-out for FIG. 9B 903A.

Figure 9B:
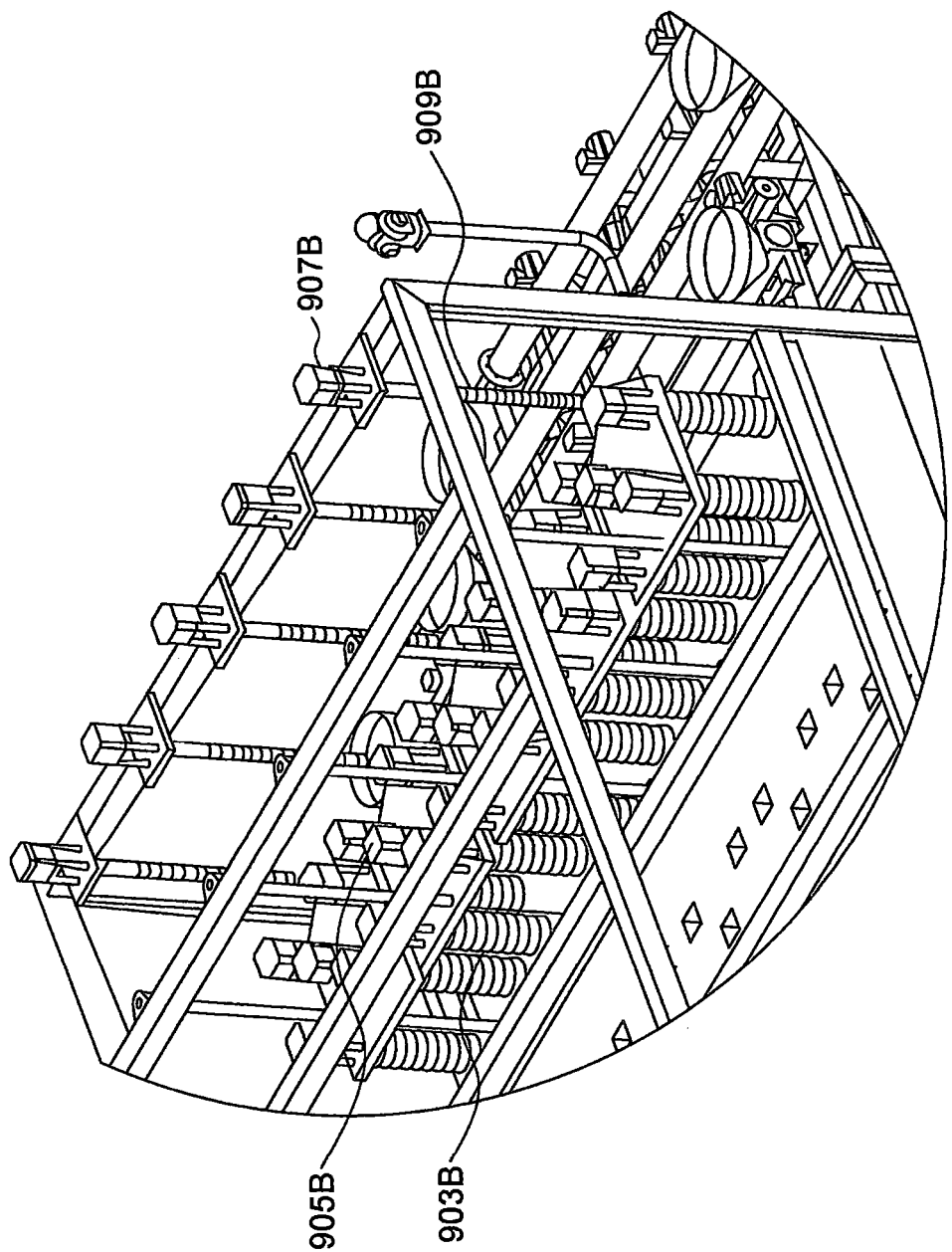
FIG. 9B illustrates a close-up of a top view of an exemplary feeder auger array with telescoping corrugated elastomer steel ring jackets, in accordance with at least one embodiment.

FIG. 9B illustrates a close-up of a top view of an exemplary feeder auger array with telescoping corrugated elastomer steel ring jackets, in accordance with at least one embodiment. FIG. 9B depicts a telescoping corrugated elastomer steel ring jacket 903B, feeder auger motor 905B, lead screw motor 907B, and lead screw 909B.

Figure 10A:
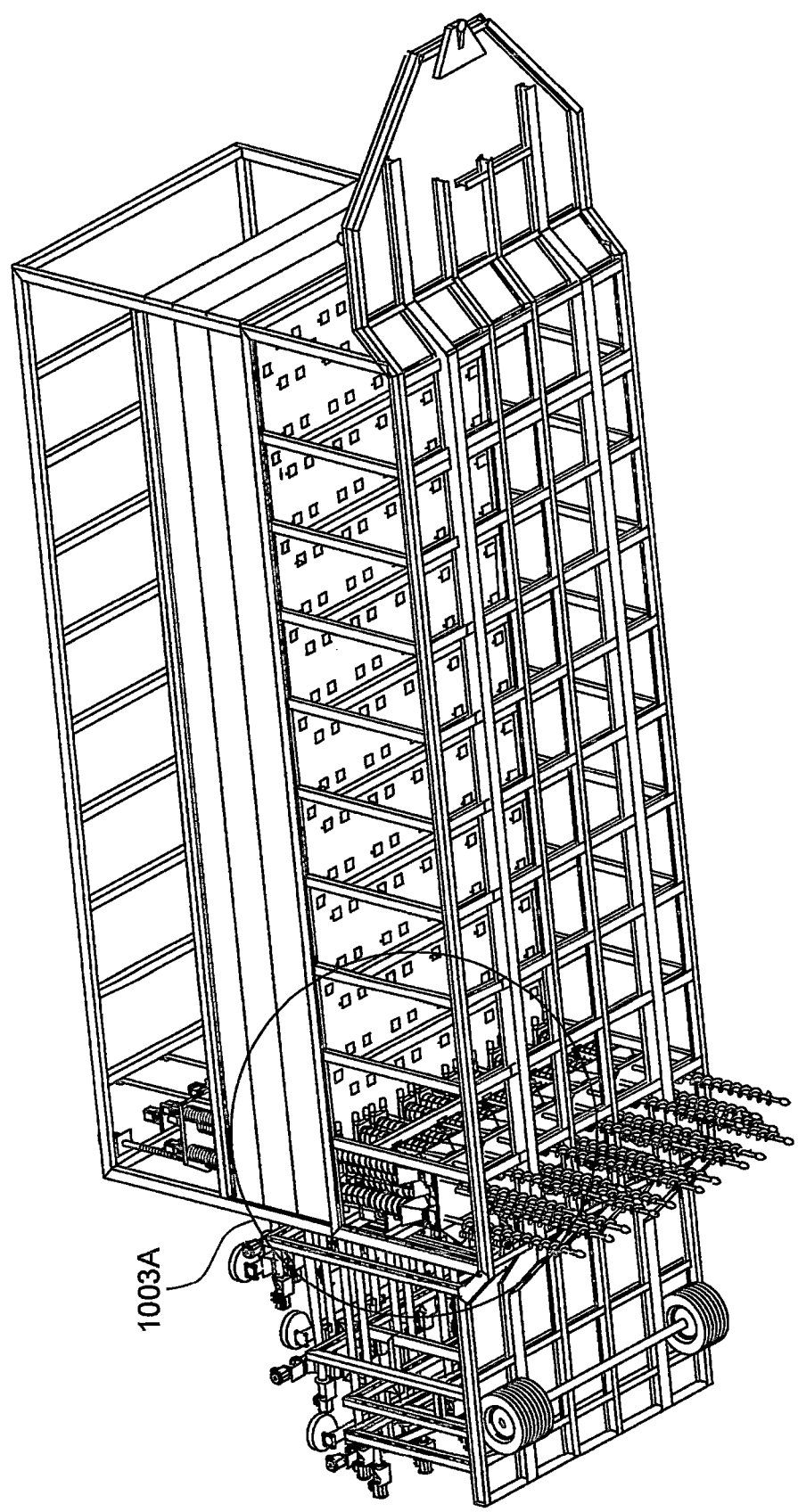
FIG. 10A illustrates a view of an exemplary constituent trailer with a feeder auger array with a corrugated elastomer steel ring jacket, in accordance with at least one embodiment.

FIG. 10A illustrates a view of an exemplary constituent trailer with a feeder auger array with a corrugated elastomer steel ring jacket, in accordance with at least one embodiment. FIG. 10A depicts constituent trailer injection drilling array 1003A.

Figure 10B:
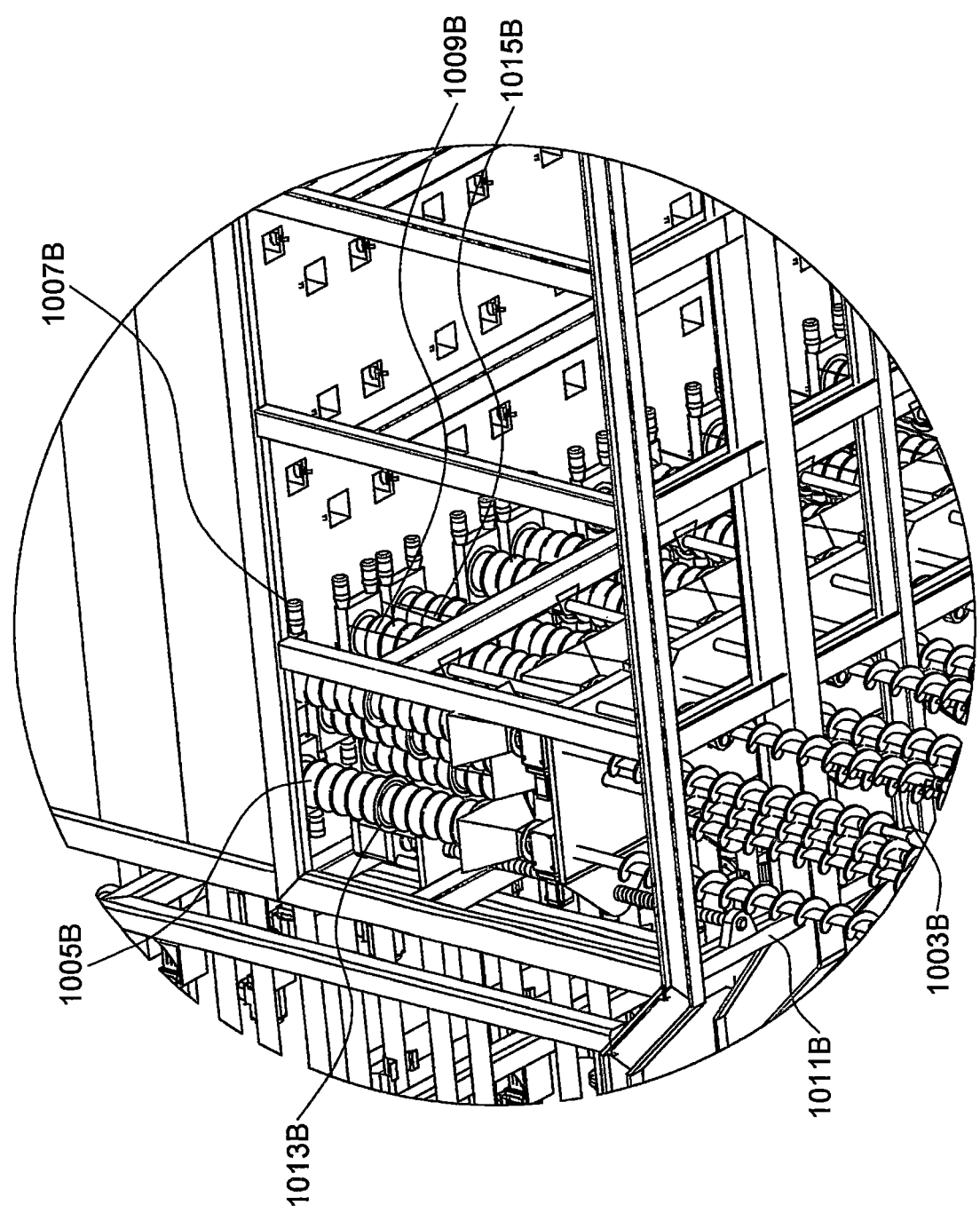
FIG. 10B illustrates a close-up view of an exemplary feeder auger array with a corrugated elastomer steel ring jacket, in accordance with at least one embodiment.

FIG. 10B illustrates a close-up view of an exemplary feeder auger array with a corrugated elastomer steel ring jacket, in accordance with at least one embodiment. FIG. 10B depicts drilling auger descended sub surface 1003B, a telescoping corrugated elastomer steel ring jacket 1005B, motor for cable guide expansion or retraction 1007B, cable guide for expansion or retraction of telescoping steel ring elastomer corrugated jacket 1009B, ten inches above ground level 1011B, an expansion steel ring of telescoping corrugated elastomer jacket 1013B, corrugated elastomer 1015B, and corrugated metal connector 1017B.

Figure 11:
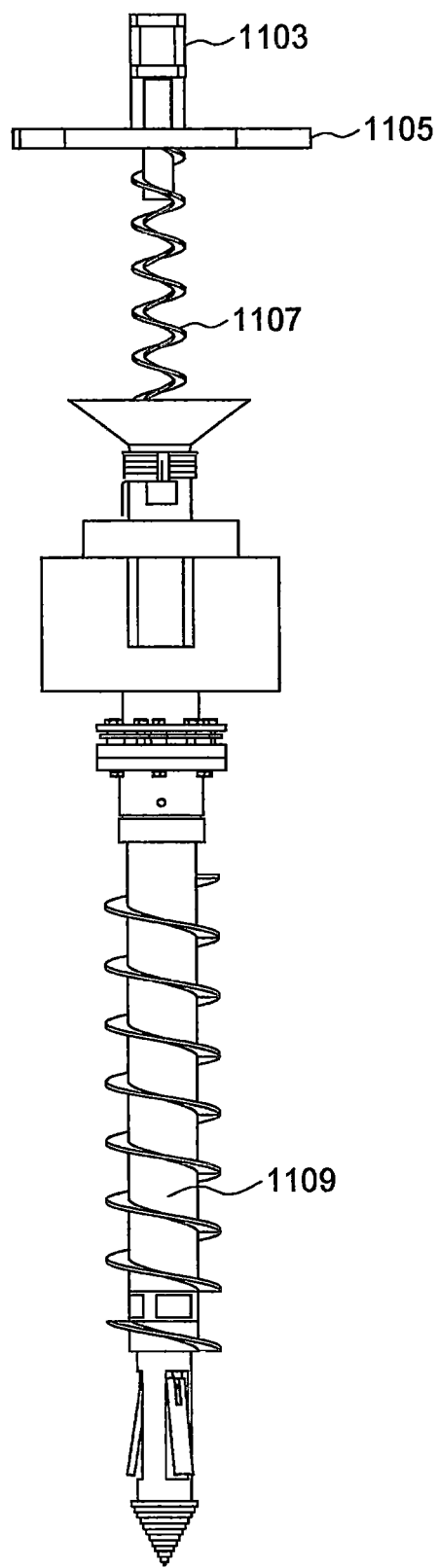
FIG. 11 illustrates a view of an exemplary feeder auger flexible conveyor wire screw, in accordance with at least one embodiment.

FIG. 11 illustrates a view of an exemplary feeder auger flexible conveyor wire screw, in accordance with at least one embodiment FIG. 11 depicts a feeder auger flexible conveyor wire screw motor 1103, a motor platform 1105, a feeder auger flexible conveyor wire screw 1107, and a hollow shaft injection drill bit 1109.

Figure 12:
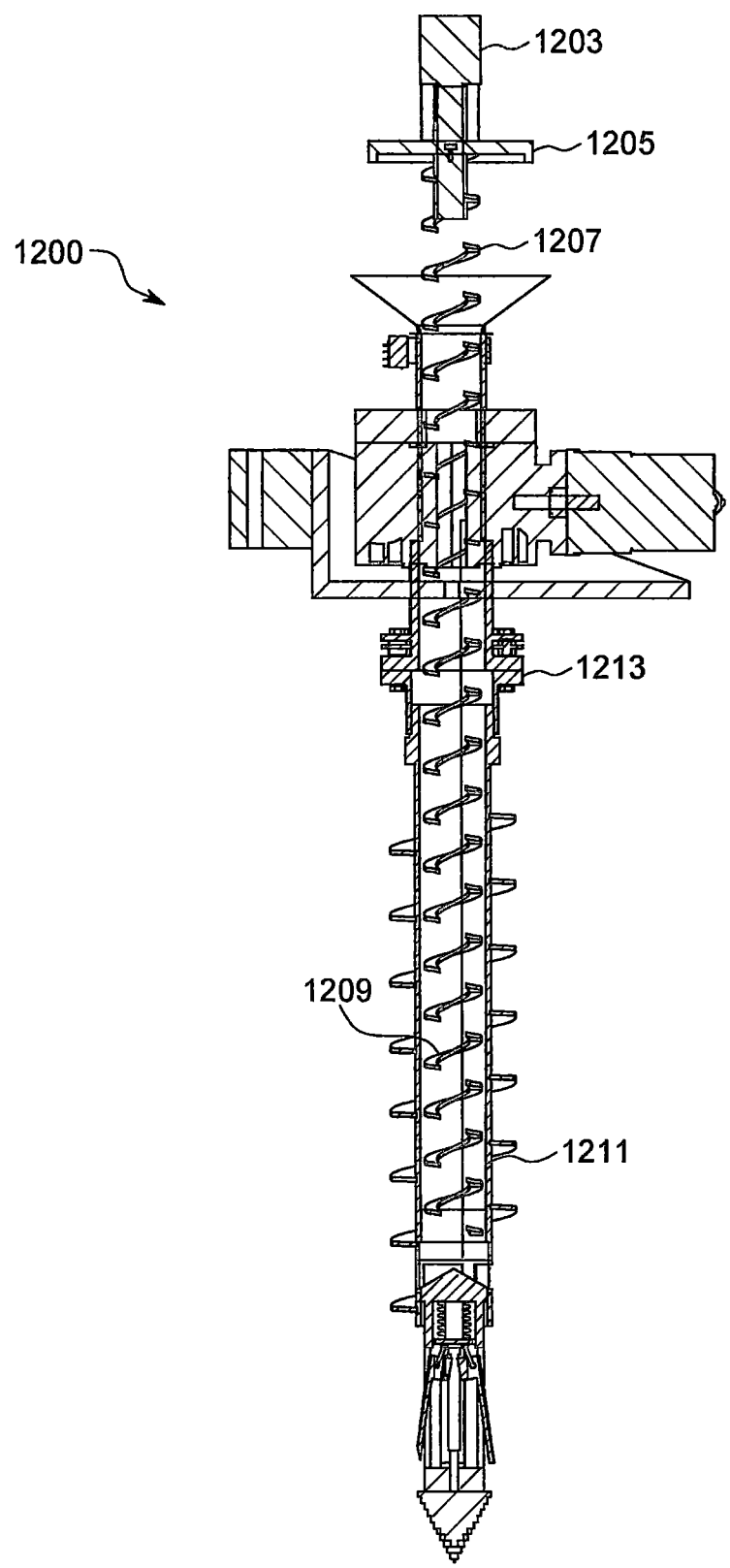
FIG. 12 illustrates a view of an exemplary cut-through view of a hollow shall injection drill bit with a feeder auger flexible conveyor wire screw, in accordance with at least one embodiment.

FIG. 12 illustrates a view of an exemplary cut-through view of a hollow shaft injection drill bit with a feeder auger flexible conveyor wire screw, in accordance with at least one embodiment. FIG. 12 depicts a feeder auger flexible conveyor wire screw motor 1203, a motor platform 1205, feeder auger flexible conveyor wire screw 1207, feeder auger flexible conveyor wire screw 1209, feeder auger conduit tubes 1211, and a disc coupling 1213.

Figure 13A:
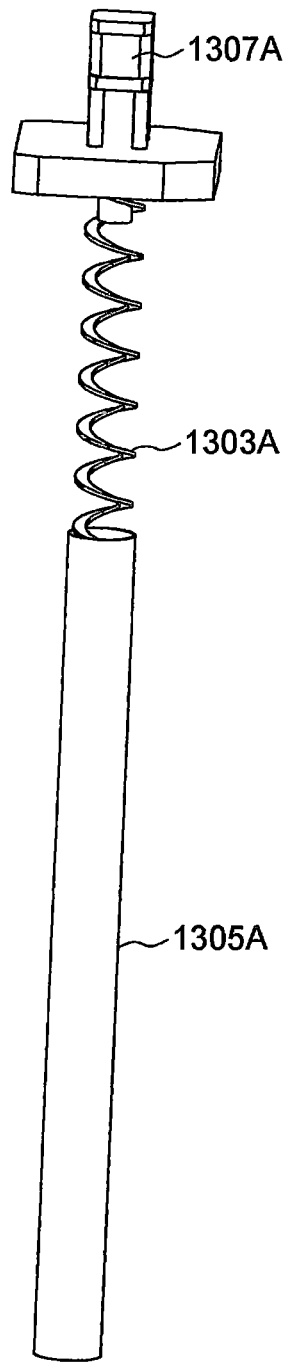
FIG. 13A illustrates a view of an exemplary feeder auger flexible conveyor wire screw and conduit tube, in accordance with at least one embodiment.

FIG. 13A illustrates a view of an exemplary feeder auger flexible conveyor wire screw and conduit tube, in accordance with at least one embodiment. FIG. 13A depicts a feeder auger flexible conveyor wire screw 1303A, a conduit tube 1305A, and a flight auger-feeder auger motor 1307A.

Figure 13B:
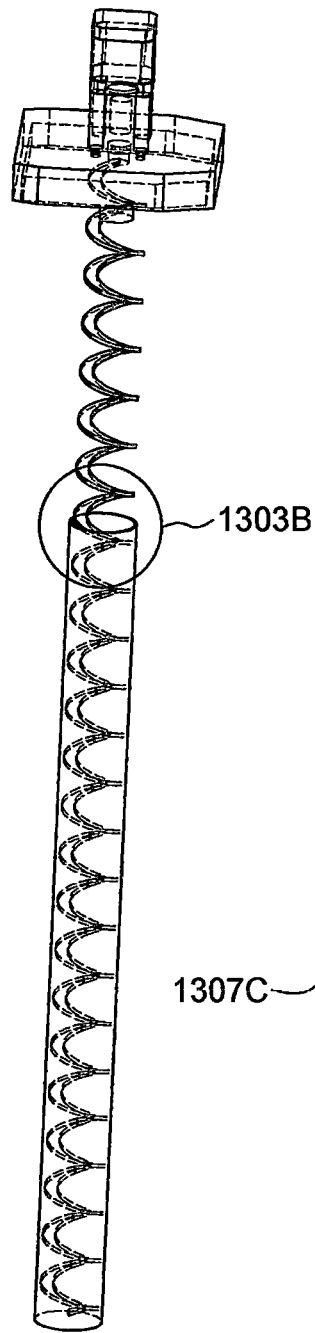
FIG. 13B illustrates a view of an exemplary feeder auger flexible conveyor wire screw and transparent conduit tube, in accordance with at least one embodiment.

FIG. 13B illustrates a view of an exemplary feeder auger flexible conveyor wire screw and transparent conduit tube, in accordance with at least one embodiment. FIG. 13B depicts a transparent conduit tube 1305B.

Figure 13C:
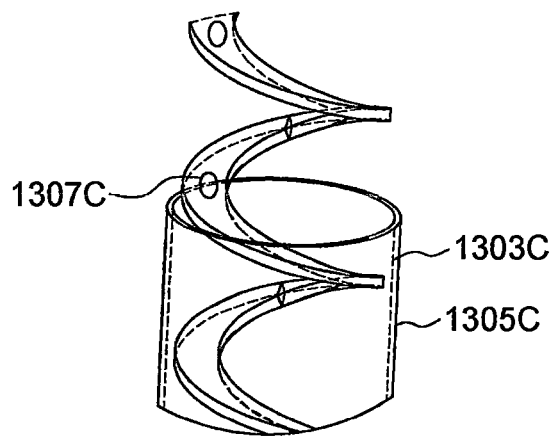
FIG. 13C illustrates a close-up view of an exemplary feeder auger flexible conveyor wire screw and transparent conduit tube, in accordance with at least one embodiment.

FIG. 13C illustrates a close-up view of an exemplary feeder auger flexible conveyor wire screw and transparent conduit tube, in accordance with at least one embodiment. FIG. 13C depicts an outer dimension wall of a transparent conduit tube 1303C, and an outer dimension wall of a transparent tube for constituents 1305C.

Figure 14A:
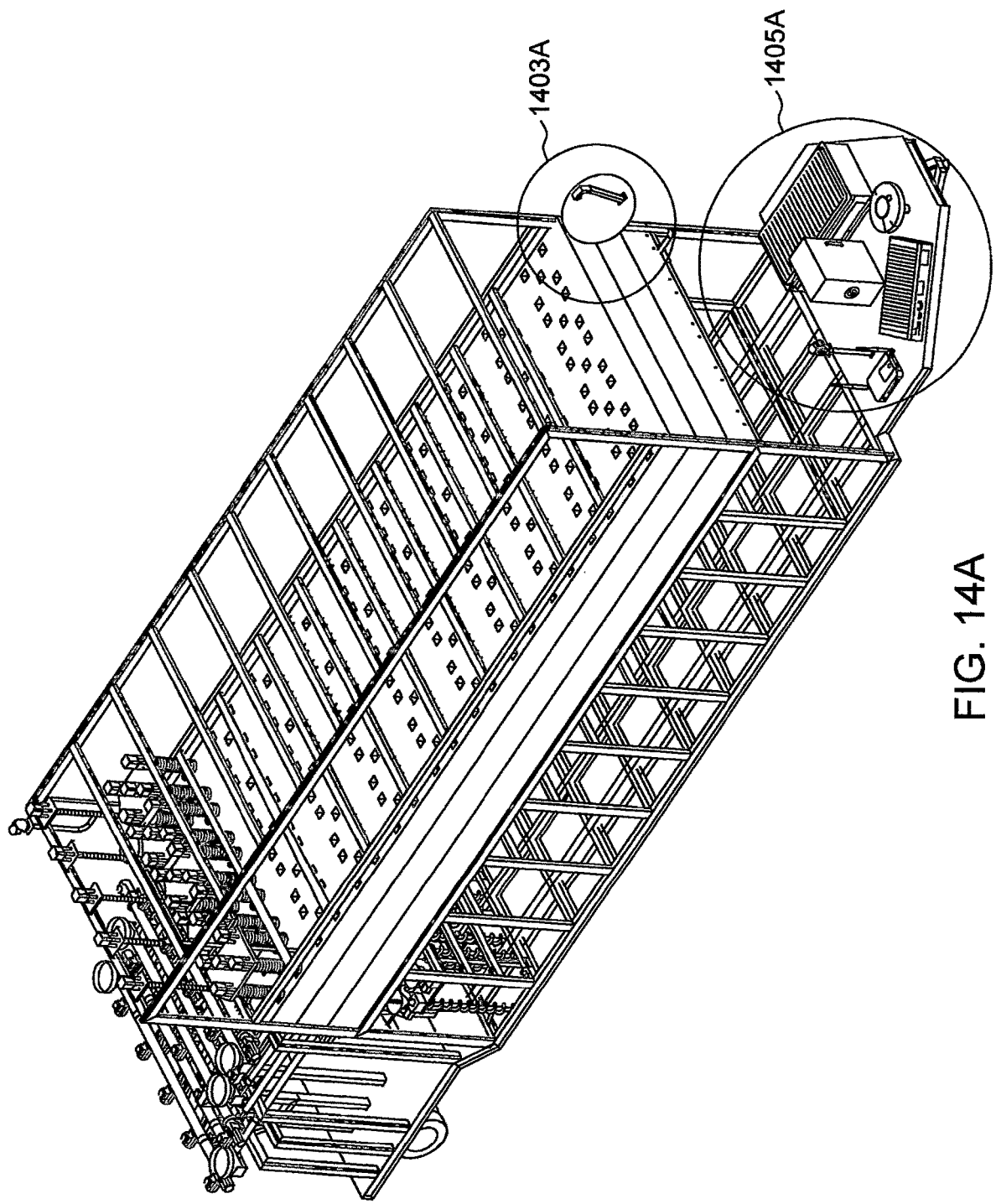
FIG. 14A illustrates a view of an exemplary communications platform of an injection drilling trailer with components seen in FIG. 14B and FIG. 14C, in accordance with at least one embodiment.

FIG. 14A illustrates a view of an exemplary communications platform of an injection drilling trailer with components seen in FIG. 14B and FIG. 14C, in accordance with at least one embodiment. FIG. 14A depicts a satellite communications dish 1403A, and communications platform containing components seen in FIG. 6C 1405A.

FIG. 14B illustrates a view of an exemplary satellite communications dish, in accordance with at least one embodiment. FIG. 14B depicts a satellite communications dish 1403B.

FIG. 14C illustrates a view of an exemplary close-up of components within the circle of FIG. 14A and 1405A, in accordance with at least one embodiment. FIG. 14C depicts a fuel cell 1403C, PLC 1405C, AI robot 1407C, router 1409C, computer 1411C, and GPS 1413C.

Figure 15:
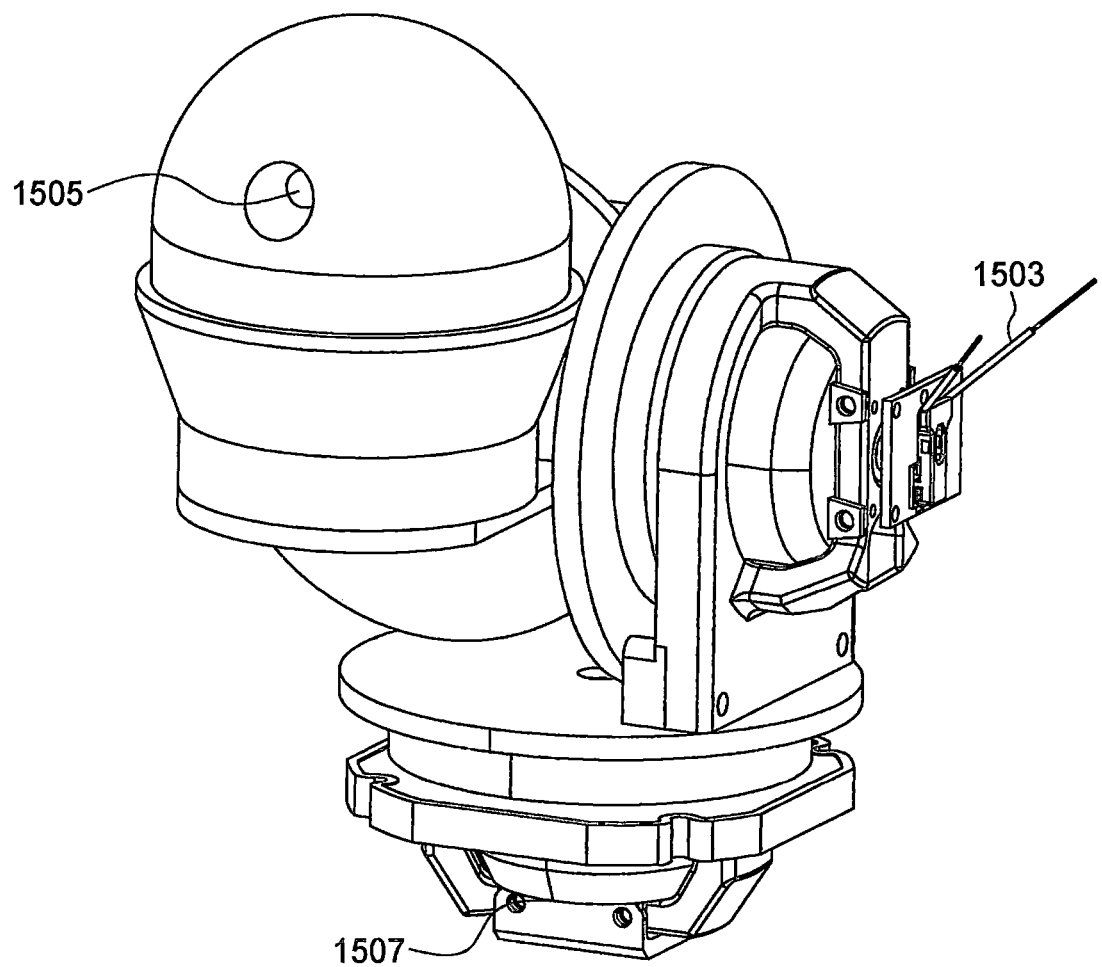
FIG. 15 illustrates a view of an exemplary AI robot, in accordance with at least one embodiment.

FIG. 15 illustrates a view of an exemplary AI robot, in accordance with at least one embodiment. FIG. 15 depicts a camera lens 1503, a gimbal 1505, and an antenna 1507.

Figure 16A:
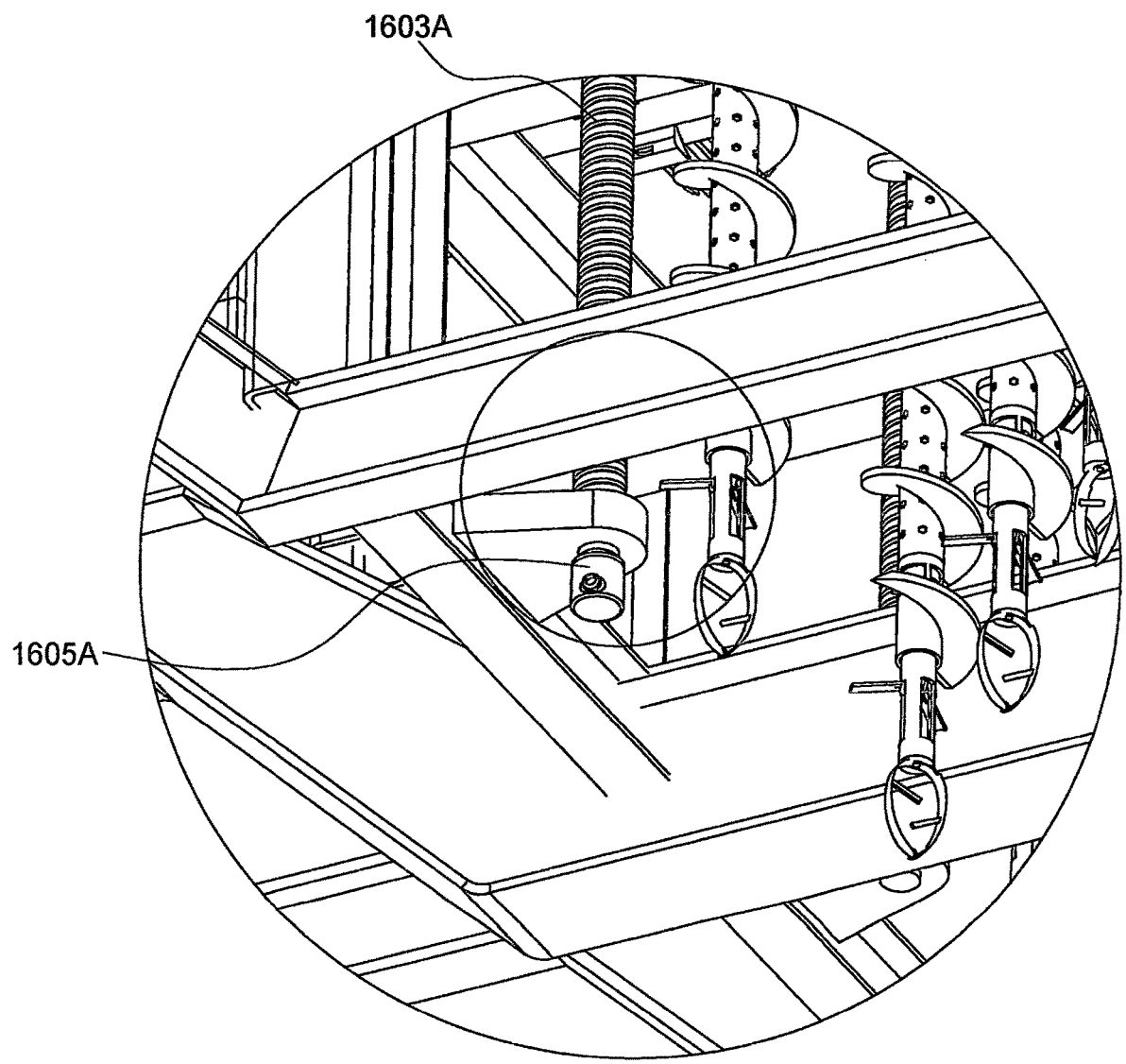
FIG. 16A illustrates a view of an exemplary encoder for lead screw revolution counting, in accordance with at least one embodiment.

FIG. 16A illustrates a view of an exemplary encoder for lead screw revolution counting, in accordance with at least one embodiment FIG. 16A depicts a lead screw 1603A, and encoder 1605A.

Figure 16B:
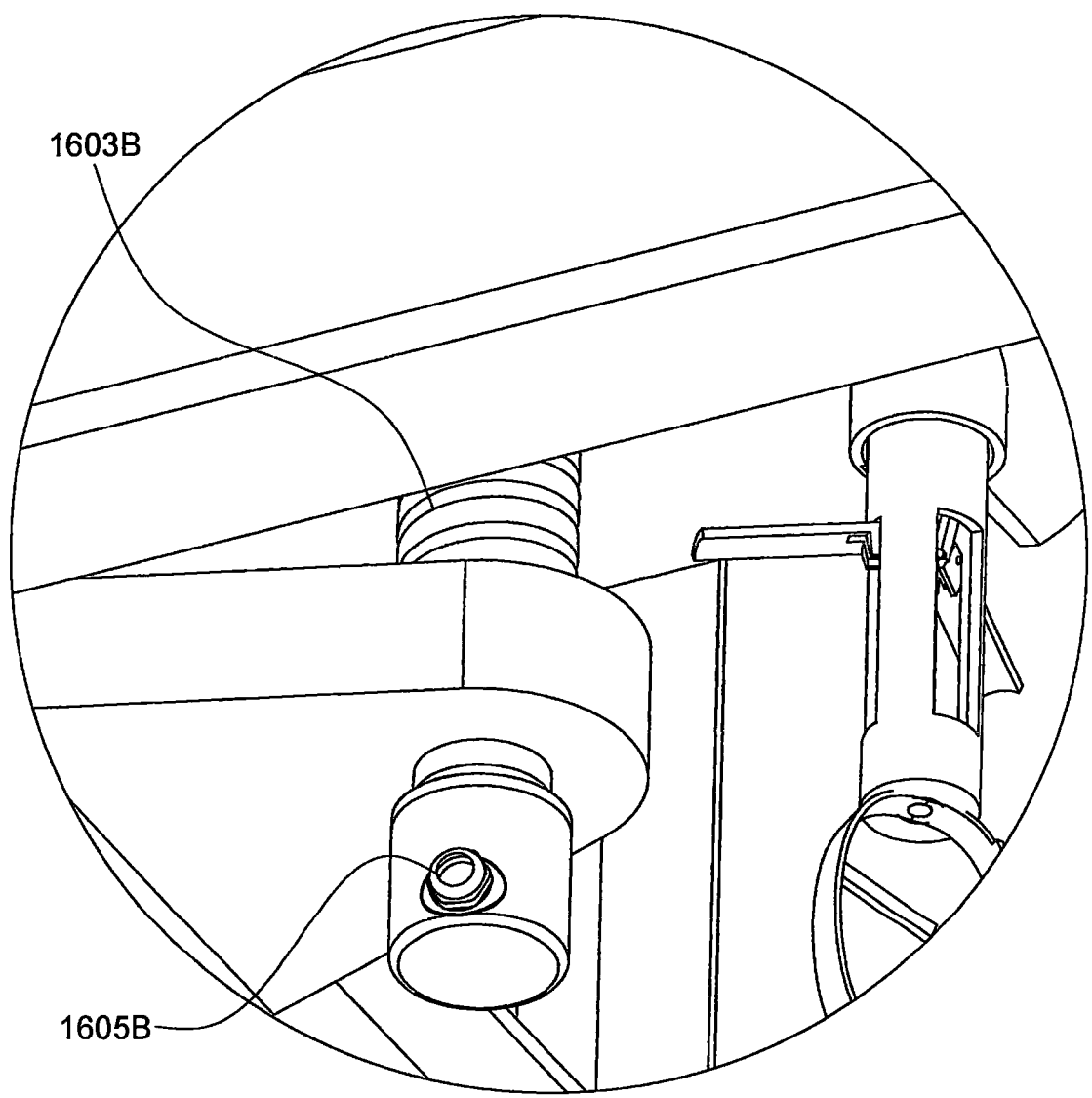
FIG. 16B illustrates a view of an exemplary close-up of FIG. 16A is an encoder for lead screw revolution counting, in accordance with at least one embodiment.

FIG. 16B illustrates a view of an exemplary close-up of FIG. 16A is an encoder for lead screw revolution counting, in accordance with at least one embodiment. FIG. 16B depicts lead screw 1603B, and encoder 1605B.

Figure 17:
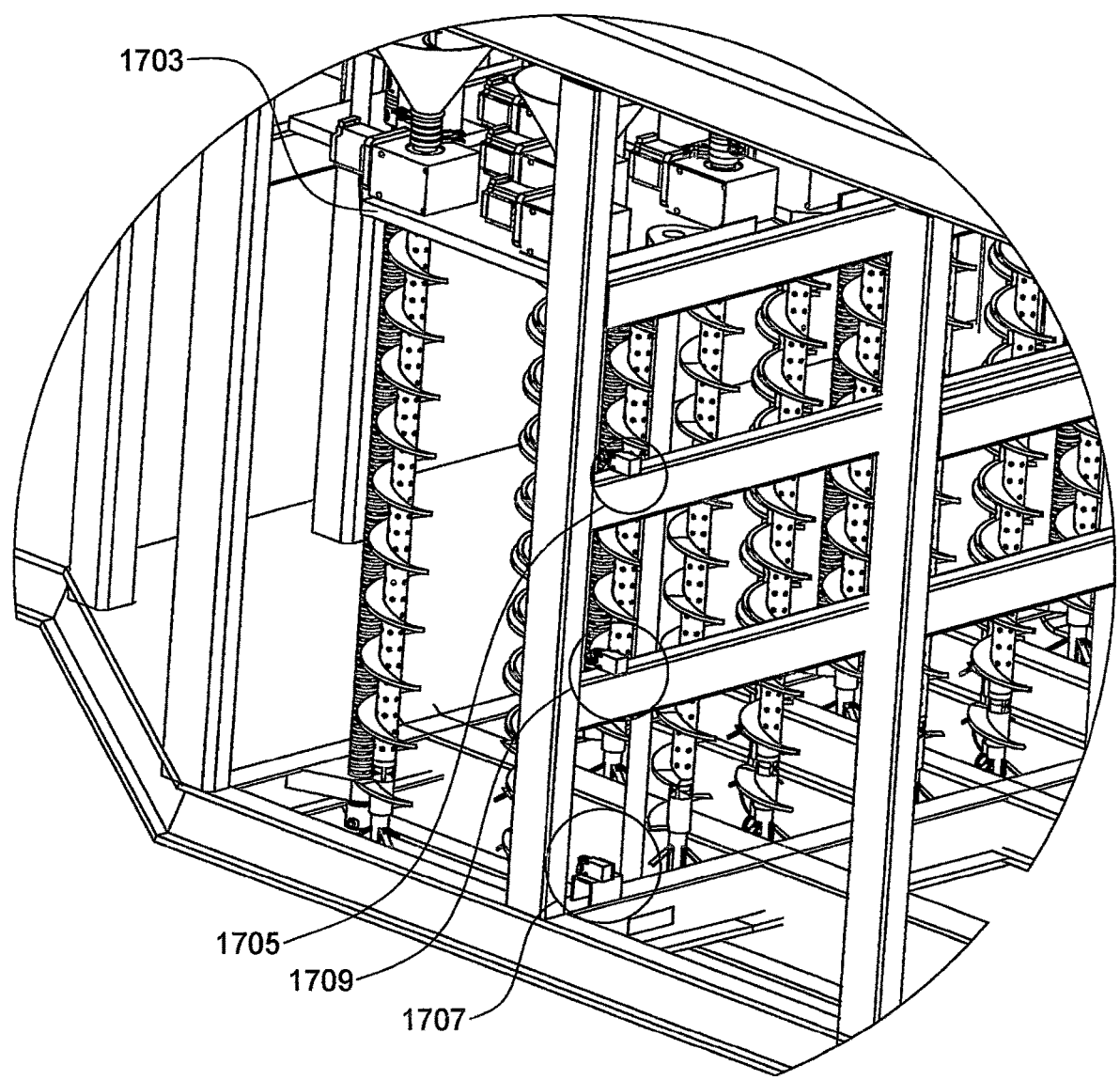
FIG. 17 illustrates a view of an exemplary view of three limit switches, in accordance with at least one embodiment.

FIG. 17 illustrates a view of an exemplary view of three limit switches, in accordance with at least one embodiment. FIG. 17 depicts an injection drill bit array platform 1703, limit switch 1705, limit switch 1707, and limit switch 1709.

Figure 18A:
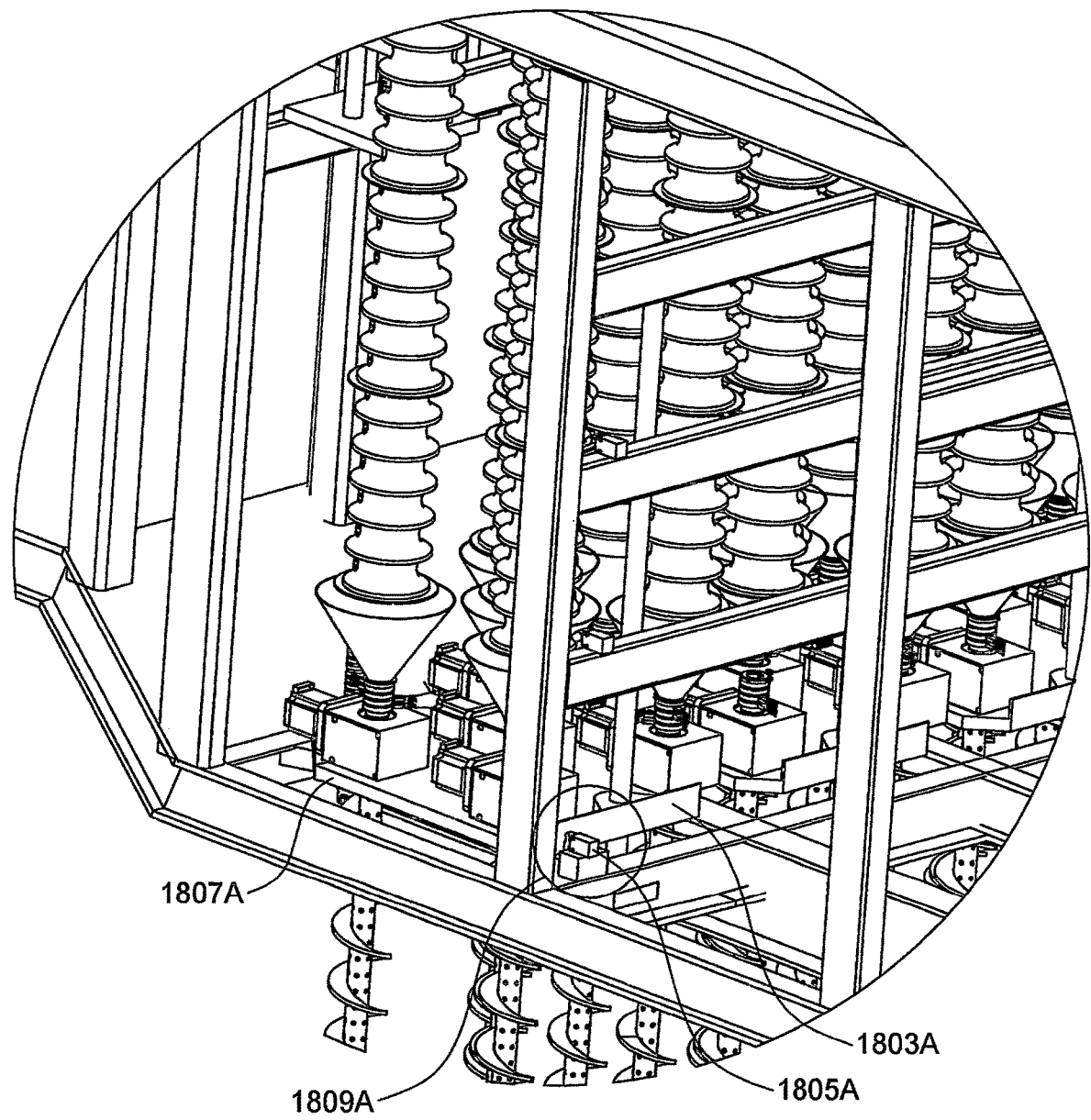
FIG. 18A illustrates a view of an exemplary limit switch that has been tripped by the injection drilling array platform having traveled to its limit setting, in accordance with at least one embodiment.

FIG. 18A illustrates a view of an exemplary limit switch that has been tripped by the injection drilling array platform having traveled to its limit setting, in accordance with at least one embodiment. FIG. 18A depicts a back wall of drilling array platform 1803A, a limit switch 1805A, drilling array platform 1807A, and a call out for close up of FIG. 10B 1809A.

Figure 18B:
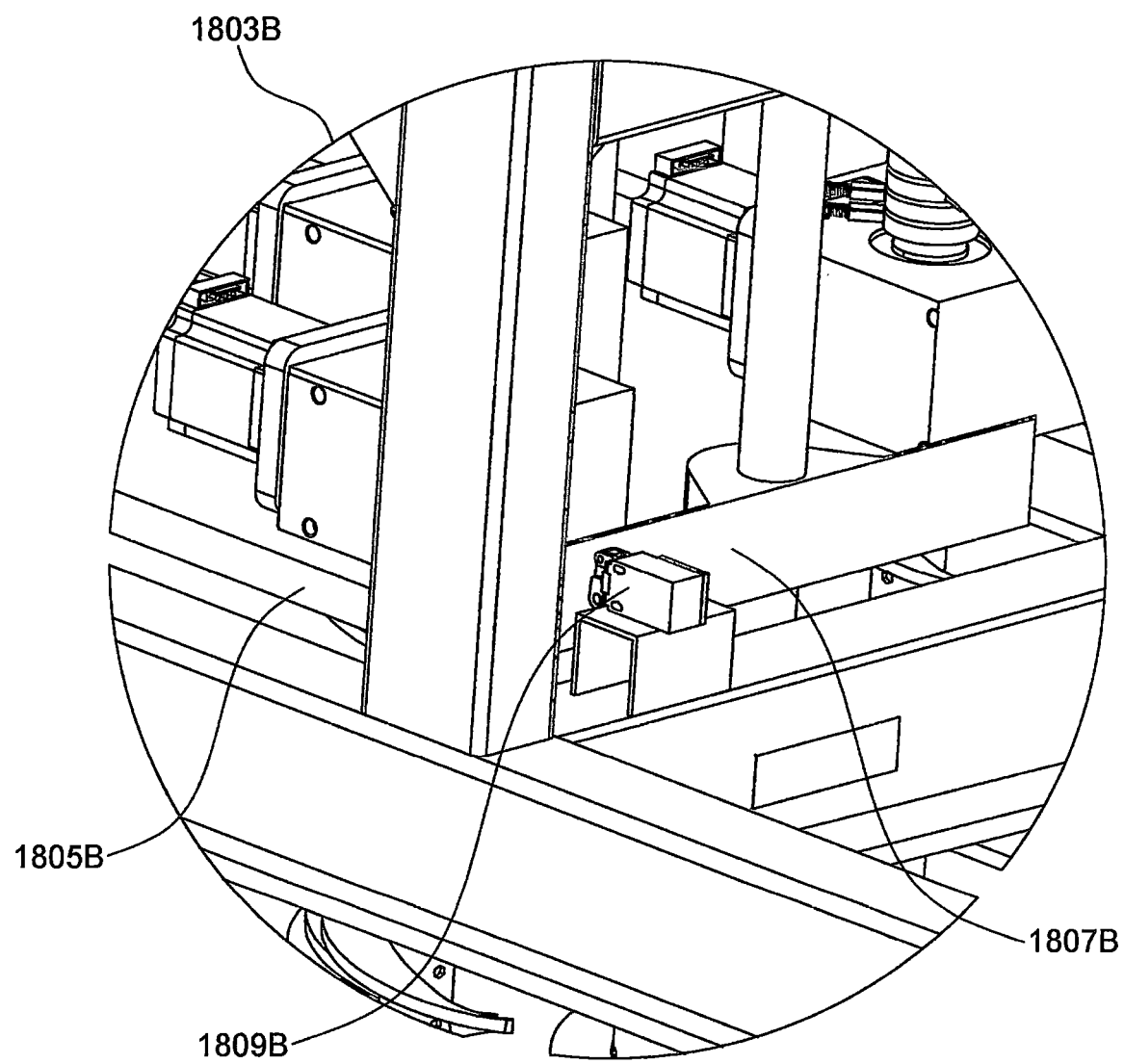
FIG. 18B illustrates a view of an exemplary close-up of FIG. 18A, in accordance with at least one embodiment.

FIG. 18B illustrates a view of an exemplary close-up of FIG. 18A, in accordance with at least one embodiment. FIG. 18B depicts a close-up of FIG. 10A (1803B) and 1009A, drilling array platform 1805B, a back wall of drilling array platform 1807B, and a limit switch 1809B.

Further, the present specification is described in conjunction with the FIGS. 1A-18B. The hollow shaft drill bit (1109) and solid or hollow shaft auger (409B) or solid or perforated hollow shaft flexible screw feeder auger (1107) includes a perforated hollow or solid shaft feeder auger (409B) or flexible screw feeder auger hollow with perforations or solid (1107), a hollow shaft drilling auger (1200), a flexible conveyor flight screws (1300), a second perforated hollow shaft feeder auger (603A), a programmable logic controller (PLC) (1405C), an Artificial intelligence (AI) robot (1505), a computer (1411C), an encoder (1605B), a plurality of limit switches (1707), a feeder auger tube conduit (1305A), and a feeder auger motor (905B). The solid or perforated hollow shaft flexible screw feeder auger (1207) is detachably attached to the hollow shaft drilling auger (1200) to receive vibration and torque that are dampened by a coupling or disc coupling (121B or 1213) between a platform and a gearbox interface. The flexible conveyor flight screws (1300) enable functions of the solid or a first perforated hollow shaft feeder auger (1303A) to continue despite receiving torque. The feeder auger tube conduit (1305A) comprises a distinct tube (1303C) within a diameter of a feeder auger tube conduit (1305C). The distinct tube (1303C) has a space between the distinct tube (1303C) to contain one or more of a plurality of electrical wires, and a plurality of other assembly items. The feeder auger motor (905B) upon receiving a signal from the AI robot (1505), the computer (1411C), and the PLC (1405C) enable the ascension of the feeder auger motor (905B) in concert with the encoder (1605B) or limit switches (1707). The feeder auger motor (905B) enables variable speeds controlled by an AI robot (1505), computer (1411C), the PLC (1405C), and/or sensor in concert with a flight motor (1307A) enabling volumes of materials to be ejected based on resistance determined by drill time and RPM measured by the encoder (1605B). The second perforated hollow shaft feeder auger (603A) through the signal from the encoder (1605B) or limit switches (1707) rotates at a pre-determined depths and sequentially places amendment constituent(s) through the AI robotic (1407C), the computer (1411C), the PLC (1405C), and a sensor programming of drill bit shaft loading and ejection.

In an embodiment, the second perforated hollow shaft feeder auger (603A) enables injectability of dry and or wet constituents creating a broad array of methodologies to amend property.

In an embodiment, the perforated hollow shaft feeder auger (603A) receives torque caused by the hollow shaft drilling auger (1200) meeting sub-surface impediments or resistance from ternary soils, 90-degree vertical position, flexible conveyor flight screws (1300) enable functions to continue despite torque.

In an embodiment, the second perforated hollow shaft feeder auger (603A) enables prescriptive amendment when efficacy requires layering of dry-state constituents with a layer(s) of humid or wet constituents above or below by way of example but does not limit time-release fertilizers.

In an embodiment, the second perforated hollow shaft feeder auger (603A) is an auger within an auger (shown in FIG. 12) with an internal auger being a ribbed helical auger or auger screw.

In an embodiment, the second perforated hollow shaft feeder auger (603A) may rotate in concert with the hollow shaft drilling auger (1200) while descending.

In an embodiment, the second perforated hollow shaft feeder auger (603A) may rotate in concert with the hollow shaft drilling auger (1200) while ascending.

In an embodiment, the second perforated hollow shaft feeder auger (603A) n ay rotate counter-clockwise to the hollow shaft drilling auger (1200) while descending.

In an embodiment, the second perforated hollow shaft feeder auger (603A) rotates counter-clockwise to the hollow shaft drilling auger (1200) while ascending to enable the ejection of constituents.

In an embodiment, the second perforated hollow shaft feeder auger (603A) through the limit switch (1707) or the encoder (1605B) or lens assessment of the AI robot (1505), wherein the data is transmitted data to the computer (1411C), and the PLC (1405C) and disperse specific volumes within a sequence of the amendment injection at specific depths.

In an embodiment, the AI robot (1505), the limit switches (1707), and the encoders (1605B) enable a gimbal, the computer (1411C), and the PLC (1405C) to process a plurality of methodologies for injection.

In an embodiment, the second perforated hollow shaft feeder auger (603A) enables a sequential loading of the constituents into the hollow drilling shaft (1200).

In an embodiment, the second perforated hollow shaft feeder auger (603A) enables the ejection of constituents by reversing the clockwise motion of the feeding auger.

In an embodiment, the second perforated hollow shaft feeder auger (603A) enables the mixing of measured constituents with liquids, or pre-mixed liquids with measured colloids, dry, damp, and or moist constituents as specific prescriptive doses of injectables at targeted depths.

In an embodiment, the second perforated hollow shaft feeder auger (603A) enables the re-loading of constituents into the hollow drill shaft (1200) at a specific depth.

In an embodiment, the second perforated hollow shaft feeder auger (603A) enables prescriptive doses of injectables at targeted depths with efficacy through the mixing of measured constituents.

In an embodiment, the second perforated hollow shaft feeder auger (603A) enables multiple particulate sizes to be injected into the hollow drill shaft (1200).

In an embodiment, the second perforated hollow shaft feeder auger (603A) enables its deployment via insertion traveling to the bottom of the hollow drill shaft opening (311B).

In an embodiment, the second perforated hollow shaft feeder auger (603A) enables its deployment for ejection of materials via insertion traveling past the bottom of the hollow drill shaft (1200) and an opened aperture (309B).

In an embodiment, the second perforated hollow shaft feeder auger (603A) enables other related inventions by attachment.

In an embodiment, the second perforated hollow shaft feeder auger (603A) is of a hollow shape for dispensing constituents.

In an embodiment, the hollow shaft drill bit (1109) and the solid or hollow shaft auger (409B) or a solid or perforated hollow shaft flexible screw feeder auger (1107) includes a feeder auger shaft (603B) to enable dispensing of constituents through perforations at the specific curved lengths corresponding depths using right angles and gravity to dispense.

In an embodiment, the second perforated hollow shaft feeder auger (603A) enables dispensing of constituents through perforations at the lower end of the hollow shaft drill hit and a sub-surface injection system.

In an embodiment, the second perforated hollow shaft feeder auger (603A) enables continued operational efficacy because of the screw auger's flexible design.

In an embodiment, the second perforated hollow shaft feeder auger (603A) enables mechanical manipulation visualized as an auger within an auger, to enhance constituent ejection by a motion of the injection drill bit in an opposite direction with the aid of the AI robot (1505), computer (1411C), the PLC (1405C) and or sensors.

In an embodiment, the second perforated hollow shaft feeder auger (603A) enables soil porosity modification through its function of loading multiple shapes and sizes of solid constituents such as but not by way of limitation, aggregates affecting Bulk Mass Density of the targeted Horizon.

In an embodiment, the second perforated hollow shaft feeder auger (603A) enables soil porosity modification through its function of loading of living Constituents such as but not by way of limitation, aneic earthworms can improve porosity by penetrating below the top soil.

In an embodiment, the second perforated hollow shaft feeder auger (603A) placed above the hollow shaft injection drill bit (1200) may have shrouds (803B) and/or conduits (1305A) for a constituent conveyance so they do not pollute the air when hollow shaft injection drilling bit (1109) is being filled with the feeder auger (603A) and/or the feeder auger flexible conveyor wire screw (1303A).

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A
    #103A Call Out for Close Up as seen in FIG. 1B
    #105A Fuel Cell AI Robotically, Computer, PLC, and or Sensor Power Source
    #107A AI Robotic, Computer, PLC, and or Sensor FIG. 1B
    #103B Hopper
    #105B Gear Box
    #107B Injection Non-Perforated Drilling Bit Sub Surface View
    #109B Auger Hollow Shaft Injection Drilling Bit
    #111B Lead Screw for #113B Damping Platform
    #113B Damping Platform
    #115B Injection Drilling Auger Motor
    #117B Feeder Auger
    #119B Ten Inches Above Ground Level
    #121B Disc Coupling FIG. 2
    #203 External Shaft of Injection Drilling Bit
    #205 Descending Feeding Auger inside Hollow Shaft of Injection Drilling Bit
    #207 Ground Level
    #209 Rib on the External Shaft of injection Drilling Auger below the ground state FIG. 3A
    #305A Friction Spring Damping Platform
    #307A Elastomer Jacket for Feeder Anger
    #309A Feeder Auger
    #311A Motor for Hollow Shaft Injection Drilling Auger
    #313A Hollow Shaft Injection Drilling Auger 1 of 5 within an array
    #315A Call Out for Close Up in FIG. 3B.
    #317A Hopper
    #319A Friction Spring Damping Platform FIG. 3B
    #303B Feeder Auger Within Hollow Shaft Injection Drilling Auger
    #305B Hollow Shaft Injection Drilling Auger Rib

307B Hollow Shaft of Injection Drilling Auger
309B Open Aperture
311B End Tip or Stopper of Feeder Auger Within Hollow Shaft Injection Drilling Auger FIG. 4A
  #403A Call Out of Close Up of FIG. 4B
  #405A Rib of Injection Drilling Auger Rib
  #407A Feeder Auger
  #409A Elastomer Tube Jacket FIG. 4B
  #403B Hollow Non-Perforated Stem Injection Drilling Auger
  #405B Hollow Non-Perforated Stem Injection Drilling Auger Rib
  #407B Aperture with Spring Loaded Cap of Hollow Non-Perforated Stem Injection Drilling Auger
  #409B Deployed Stopper at Tip of Feeder Auger FIG. 5A
  #503A Close Up of Drilling Array for FIG. 5B
  #505A Feeder Auger Lead Screw FIG. 5B
  #503B Hollow Shaft Injection Drill Bit Motor
  #505B Hollow Shaft Injection Drill Bit
  #507B Lead Screw for Hollow Shaft injection Drill Bit
  #509B Feeder Auger before insertion
  #511B Hopper FIG. 5C
  #503C Hollow Shaft Feeder Auger
  #505C Perforation Hollow Shaft Feeder Auger
  #507C Hopper
  #509C Friction Spring Flange
  #511C Feed auger lateral perforations FIG. 6A
  #603A Call Out for FIG. 6B Close Up of Perforated Hollow Shaft Feeder Auger FIG. 6B
  #603B External Wall of Hollow Feeder Auger Flight Shaft
  #605B Rib of Hollow Feeder Auger Flight Shaft
  #607B Perforation of Hollow Feeder Auger Flight Shaft FIG. 7A
  #703A Feeder Auger Arrays FIG. 7B
  #703B Telescoping Corrugated Elastomer Steel Ring Jacket
  #705B Feeder Auger FIG. 8A
  #803A Feeder Auger with Telescoping Corrugated Elastomer Steel Ring Jacket
  #805A Injection Drill Bit Array FIG. 8B
  #803B Feeder Auger Telescoping Corrugated Elastomer Steel Ring jacket
  #805B Feeder Auger
  #807B Injection Drill Bit Hopper FIG. 9A
  #903A Call Out for FIG. 9B FIG. 9B
  #903B Telescoping Corrugated Elastomer Steel Ring Jacket
  #905B Feeder Auger Motor
  #907B Lead Screw Motor
  #909B Lead Screw FIG. 10A
  #1003A Constituent Trailer Injection Drilling Array FIG. 10B
  #1003B Drilling Auger Descended Sub Surface
  #1005B Telescoping Corrugated Elastomer Steel Ring Jacket
  #1007B Motor for Cable Guide Expansion or Retraction
  #1009B Cable Guide for Expansion or Retraction of Telescoping Steel Ring Elastomer Corrugated Jacket
  #1011B Ten Inches Above Ground Level
  #1013B An Expansion Steel Ring of Telescoping Corrugated Elastomer Jacket
  #1015B Corrugated Elastomer
  #1017B Corrugated Metal Connector FIG. 11
  #1103 Feeder Auger Flexible Conveyor Wire Screw Motor
  #1105 Motor Platform
  #1107 Feeder Auger Flexible Conveyor Wire Screw
  #1109 Hollow Shaft Injection Drill Bit FIG. 12
  #1203 Feeder Auger Flexible Conveyor Wire Screw Motor
  #1205 Motor Platform
  #1207 Feeder Auger Flexible Conveyor Wire Screw
  #1209 Feeder Auger flexible Conveyor Wire Screw
  #1211 Feeder Auger Conduit Tubes
  #1213 Disc Coupling FIG. 13A
  #1303A Feeder Auger Flexible Conveyor Wire Screw
  #1305A Conduit Tube
  #1307A Flight Auger-Feeder Auger Motor FIG. 13B
  #1305B Transparent Conduit Tube FIG. 13C
  #1303C Outer Dimension Wall of a Transparent Conduit Tube
  #1305C Outer Dimension Wall of a Transparent Tube for Constituents FIG. 14A
  #1403A Satellite Communications Dish
  #1405A Communications Platform containing components seen in FIG. 6C FIG. 14B
  #1403B Satellite Communications Dish FIG. 14C
  #1403C Fuel Cell
  #1405C PLC
  #1407C AI Robot
  #1409C Router
  #1411C Computer
  #1413C GPS FIG. 15
  #1503 Camera Lens
  #1505 Gimbal
  #1507 Antenna FIG. 16A
  #1603A Lead Screw
  #1605A Encoder FIG. 16B
  #1603B Lead Screw
  #1605B Encoder FIG. 17
  #1703 injection Drill Bit Array Platform
  #1705 Limit Switch
  #1707 Limit Switch
  #1709 Limit Switch FIG. 18A
1803A Back Wall of Drilling Array Platform
1805A Limit Switch
1807A Drilling Array Platform
1809A Call Out for Close Up of FIG. 10B
FIG. 18B
1803B Close Up of FIG. 10A and #1009A
1805B Drilling Array Platform
1807B Back Wall a Drilling Array Platform
1809B Limit Switch

The invention claimed is:

1. A hollow shaft drill bit and a solid or hollow shaft auger or a solid or perforated hollow shaft flexible screw feeder auger, comprising:
 a perforated hollow or solid shaft feeder auger or flexible screw feeder auger hollow with perforations or solid;
 a hollow shaft drilling auger, wherein the solid or perforated hollow shaft flexible screw feeder auger is detachably attached to the hollow shaft drilling auger to receive vibration and torque that are dampened by a coupling or disc coupling between a platform and a gearbox interface;
 a flexible conveyor flight screws to enable functions of the solid or a first perforated hollow shaft feeder auger to continue despite receiving torque;
 a second perforated hollow shaft feeder auger;
 a programmable logic controller (PLC);
 an Artificial intelligence (AI) robot;
 a computer;
 an encoder;
 a plurality of limit switches;
 a feeder auger tube conduit comprises a distinct tube within a diameter of a feeder auger tube conduit, wherein the distinct tube has a space between the distinct tube to contain one or more of a plurality of electrical wires, and a plurality of other assembly items; and
 a feeder auger motor upon receiving a signal from the AI robot, the computer, and the PLC enable the ascension of the feeder auger motor in concert with the encoder or limit switches,
 wherein the feeder auger motor enables variable speeds controlled by the AI robot, computer, the PLC, and/or sensor in concert with a flight motor enabling volumes of materials to be ejected based on resistance determined by drill time and RPM measured by the encoder,
 wherein the second perforated hollow shaft feeder auger through the signal from the encoder or limit switches rotates at a pre-determined depths and sequentially places amendment constituent(s) through the AI robotic, the computer, the PLC, and a sensor programming of drill bit shaft loading and ejection.

2. The hollow shaft drill bit and the solid or hollow shaft auger or a solid or perforated hollow shaft flexible screw feeder auger as claimed in claim 1, wherein the second perforated hollow shaft feeder auger enables injectability of dry and or wet constituents creating a broad array of methodologies to amend property.

3. The hollow shaft drill bit and the solid or hollow shaft auger or a solid or perforated hollow shaft flexible screw feeder auger as claimed in claim 1, wherein the second perforated hollow shaft feeder auger enables prescriptive amendment when efficacy requires layering of dry-state constituents with a layer(s) of humid or wet constituents above or below by way of example but not limitation time-release fertilizers.

4. The hollow shaft drill bit and the solid or hollow shaft auger or a solid or perforated hollow shaft flexible screw feeder auger as claimed in claim 1, wherein the second perforated hollow shaft feeder auger is an auger within an auger with an internal auger being a ribbed helical auger or auger screw.

5. The hollow shaft drill bit and the solid or hollow shaft auger or a solid or perforated hollow shaft flexible screw feeder auger as claimed in claim 1, wherein the second perforated hollow shaft feeder auger may rotate in concert with the hollow shaft drilling auger while descending.

6. The hollow shaft drill bit and the solid or hollow shaft auger or a solid or perforated hollow shaft flexible screw feeder auger as claimed in claim 1, wherein the second perforated hollow shaft feeder auger may rotate in concert with the hollow shaft drilling auger while ascending.

7. The hollow shaft drill bit and the solid or hollow shaft auger or a solid or perforated hollow shaft flexible screw feeder auger as claimed in claim 1, wherein the second perforated hollow shaft feeder auger may rotate counter-clockwise to the hollow shaft drilling auger while descending.

8. The hollow shaft drill bit and the solid or hollow shaft auger or a solid or perforated hollow shaft flexible screw feeder auger as claimed in claim 1, wherein the second perforated hollow shaft feeder auger rotates counter-clockwise to the hollow shaft drilling auger while ascending to enable ejection of constituents.

9. The hollow shaft drill bit and the solid or hollow shaft auger or a solid or perforated hollow shaft flexible screw feeder auger as claimed in claim 1, wherein the second perforated hollow shaft feeder auger through the limit switch or the encoder or lens assessment of the AI robot, wherein the data is transmitted data to the computer, and the PLC and disperse specific volumes within a sequence of the amendment injection at specific depths.

10. The hollow shaft drill bit and the solid or hollow shaft auger or a solid or perforated hollow shaft flexible screw feeder auger as claimed in claim 1, wherein the AI robot, the limit switches, and the encoders enable a gimbal, the computer, and the PLC to process a plurality of methodologies for injection.

11. The hollow shaft drill bit and the solid or hollow shaft auger or a solid or perforated hollow shaft flexible screw feeder auger as claimed in claim 1, wherein the second perforated hollow shaft feeder auger enables a sequential loading of the constituents into the hollow drilling shaft.

12. The hollow shaft drill bit and the solid or hollow shaft auger or a solid or perforated hollow shaft flexible screw feeder auger as claimed in claim 1, wherein the second perforated hollow shaft feeder auger enables ejection of constituents by reversing the clockwise motion of the feeding auger.

13. The hollow shaft drill bit and the solid or hollow shaft auger or a solid or perforated hollow shaft flexible screw feeder auger as claimed in claim 1, wherein the second perforated hollow shaft feeder auger enables mixing of measured constituents with liquids, or pre-mixed liquids with measured colloids, dry, damp, and or moist constituents as specific prescriptive doses of injectables at targeted depths.

14. The hollow shaft drill bit and the solid or hollow shaft auger or a solid or perforated hollow shaft flexible screw feeder auger as claimed in claim 1, wherein the second perforated hollow shaft feeder auger enables re-loading of constituents into the hollow drill shaft at a specific depth.

15. The hollow shaft drill bit and the solid or hollow shaft auger or a solid or perforated hollow shaft flexible screw feeder auger as claimed in claim 1, wherein the second perforated hollow shaft feeder auger enables prescriptive doses of injectables at targeted depths with efficacy through the mixing of measured constituents.

16. The hollow shaft drill bit and the solid or hollow shaft auger or a solid or perforated hollow shaft flexible screw feeder auger as claimed in claim 1, wherein the second perforated hollow shaft feeder auger enables multiple particulate sizes to be injected into the hollow drill shaft.

17. The hollow shaft drill bit and the solid or hollow shaft auger or a solid or perforated hollow shaft flexible screw feeder auger as claimed in claim 1, wherein the second perforated hollow shaft feeder auger enables its deployment via insertion traveling to the bottom of the hollow drill shaft opening.

18. The hollow shaft drill bit and the solid or hollow shaft auger or a solid or perforated hollow shaft flexible screw feeder auger as claimed in claim 1, wherein the second perforated hollow shaft feeder auger enables its deployment for ejection of materials via insertion traveling past the bottom of the hollow drill shaft and an opened aperture.

19. The hollow shaft drill bit and the solid or hollow shaft auger or a solid or perforated hollow shaft flexible screw feeder auger as claimed in claim 1, wherein the second perforated hollow shaft feeder auger enables other related inventions by attachment.

20. The hollow shaft drill bit and the solid or hollow shaft auger or a solid or perforated hollow shaft flexible screw feeder auger as claimed in claim 1, wherein the second perforated hollow shaft feeder auger is of a hollow shape for dispensing of constituents.

21. The hollow shaft drill bit and the solid or hollow shaft auger or a solid or perforated hollow shaft flexible screw feeder auger as claimed in claim 1, comprises a feeder auger shaft to enable dispensing of constituents through perforations at the specific curved lengths corresponding depths using right angles and gravity to dispense.

22. The hollow shaft drill bit and the solid or hollow shaft auger or a solid or perforated hollow shaft flexible screw feeder auger as claimed in claim 1, wherein the second perforated hollow shaft feeder auger enables dispensing of constituents through perforations at the lower end of the hollow shaft drill bit and a sub-surface injection system.

23. The hollow shaft drill bit and the solid or hollow shaft auger or a solid or perforated hollow shaft flexible screw feeder auger as claimed in claim 1, wherein the second perforated hollow shaft feeder auger enables continued operational efficacy because of the screw augers flexible design.

24. The hollow shaft drill bit and the solid or hollow shaft auger or a solid or perforated hollow shaft flexible screw feeder auger as claimed in claim 1, wherein the second perforated hollow shaft feeder auger enables mechanical manipulation visualized as an auger within an auger, to enhance constituent ejection by a motion of the injection drill bit in an opposite direction with the aid of the AI robot, computer, the PLC and or sensors.

25. The hollow shaft drill bit and the solid or hollow shaft auger or a solid or perforated hollow shaft flexible screw feeder auger as claimed in claim 1, wherein the second perforated hollow shaft feeder auger enables soil porosity modification through its function of loading of multiples shape and sizes of solid constituents such as but not by way of limitation, aggregates affecting Bulk Mass Density of the targeted Horizon.

26. The hollow shaft drill bit and the solid or hollow shaft auger or a solid or perforated hollow shaft flexible screw feeder auger as claimed in claim 1, wherein the second perforated hollow shaft feeder auger enables soil porosity modification through its function of loading of living Constituents such as but not by way of limitation, aneic earthworms can improve Porosity by penetrating below the top soil.

27. The hollow shaft drill bit and the solid or hollow shaft auger or a solid or perforated hollow shaft flexible screw feeder auger as claimed in claim 1, wherein the second perforated hollow shaft feeder auger placed above the hollow shaft injection drill bit may have shrouds and/or conduits for a constituent conveyance so they do not pollute the air when hollow shaft injection drilling bit is being filled with the feeder auger and/or the feeder auger flexible conveyor wire screw.

* * * * *